(12) United States Patent
Zalis

(10) Patent No.: US 6,947,784 B2
(45) Date of Patent: Sep. 20, 2005

(54) SYSTEM FOR DIGITAL BOWEL SUBTRACTION AND POLYP DETECTION AND RELATED TECHNIQUES

(75) Inventor: Michael E. Zalis, Brookline, MA (US)

(73) Assignee: The General Hospital Corporation, Boston, MA (US)

(*) Notice: Subject to any disclaimer, the term of this patent is extended or adjusted under 35 U.S.C. 154(b) by 537 days.

(21) Appl. No.: 09/828,268

(22) Filed: Apr. 6, 2001

(65) Prior Publication Data

US 2002/0097320 A1 Jul. 25, 2002

Related U.S. Application Data

(60) Provisional application No. 60/195,654, filed on Apr. 7, 2000.

(51) Int. Cl.[7] .............................. A61B 5/05; H05G 1/60
(52) U.S. Cl. .......................................... 600/425; 378/4
(58) Field of Search ................................ 600/429, 425, 600/407, 426, 428, 424, 410, 378, 21, 25, 26, 27, 427; 324/307, 308, 309; 378/21, 4, 22, 23, 24, 25, 26, 27

(56) References Cited

U.S. PATENT DOCUMENTS

| | | | |
|---|---|---|---|
| 4,862,081 A | 8/1989 | Denison | |
| 5,458,111 A | 10/1995 | Coin | |
| 5,467,639 A | 11/1995 | Johnson | |
| 5,611,342 A | 3/1997 | Widder | |
| 5,633,453 A | 5/1997 | Johnson | |
| 5,647,360 A | 7/1997 | Bani-Hashemi et al. | |
| 5,740,222 A | 4/1998 | Fujita et al. | |
| 5,748,768 A | 5/1998 | Sivers et al. | |
| 5,781,605 A | 7/1998 | Wohlrab | |
| 5,841,148 A | 11/1998 | Some et al. | |
| 5,848,121 A | 12/1998 | Gupta et al. | |
| 5,873,824 A | 2/1999 | Doi et al. | |
| 5,891,030 A * | 4/1999 | Johnson et al. | |
| 5,971,767 A | 10/1999 | Kaufman et al. | |
| 5,986,662 A | 11/1999 | Argiro et al. | |
| 5,987,347 A | 11/1999 | Khoury et al. | |
| 6,004,270 A | 12/1999 | Urbano et al. | |
| 6,331,116 B1 | 12/2001 | Kaufman et al. | |
| 6,343,936 B1 | 2/2002 | Kaufman et al. | |
| 6,366,800 B1 * | 4/2002 | Vining et al. | 600/425 |
| 6,477,401 B1 | 11/2002 | Johnson et al. | |
| 6,514,082 B2 | 2/2003 | Kaufman et al. | |
| 6,564,892 B2 * | 5/2003 | Wooldridge et al. | 180/68.4 |
| 6,587,575 B1 * | 7/2003 | Windham et al. | 382/110 |
| 6,728,334 B1 * | 4/2004 | Zhao | 378/62 |

FOREIGN PATENT DOCUMENTS

| | | | | |
|---|---|---|---|---|
| WO | 9837517 | 8/1998 | | G06T/15/40 |
| WO | 0055278 | 9/2000 | | G06T/17/20 |
| WO | 0055812 | 9/2000 | | G06T/15/40 |

OTHER PUBLICATIONS

Martin Roos, "Medical Electronics", IEEE Spectrum Jan. 2000, pp. 110–118.

"Seeing the Body Electric, in 3–D," W. St. J., Jan. 27, 2000, 1 page.

"Katie's Crusade", Time Magazine, Mar. 13, 2000, pp. 70–76.

* cited by examiner

Primary Examiner—Daniel Robinson
(74) Attorney, Agent, or Firm—Daly, Crowley & Mofford, LLP

(57) ABSTRACT

A system for performing a virtual colonoscopy includes a system for generating digital images, a storage device for storing the digital images, a digital bowel subtraction processor coupled to receive images of a colon from the storage device and for removing the contents of the colon from the image and an automated polyp detection processor coupled to receive images of a colon from the storage device and for detecting polyps in the colon image.

42 Claims, 20 Drawing Sheets

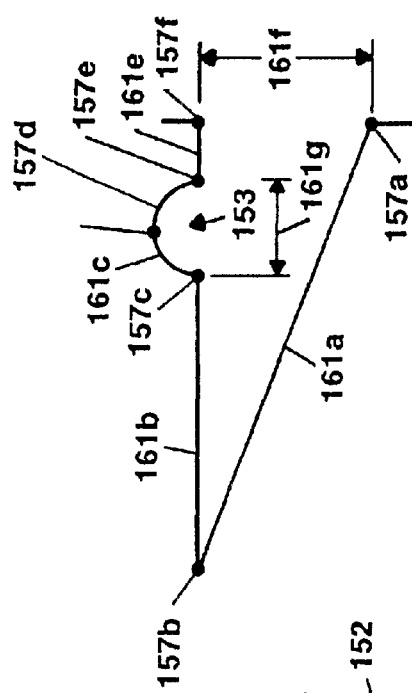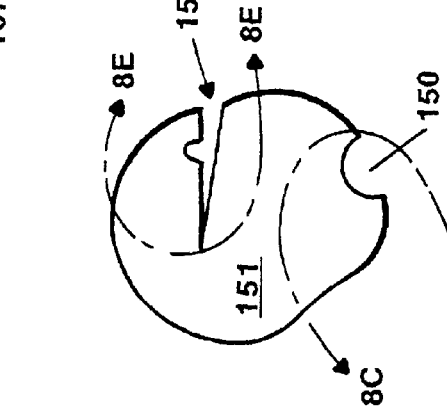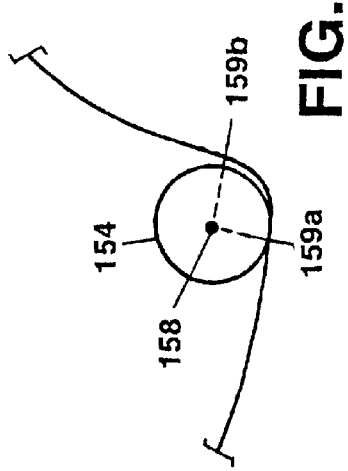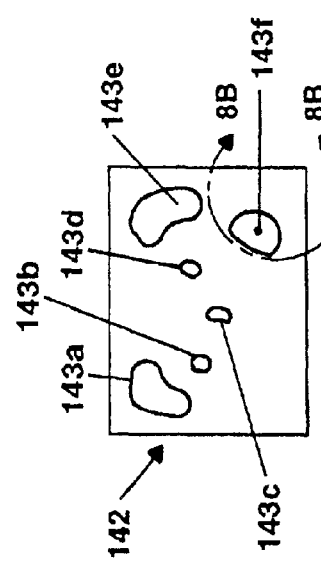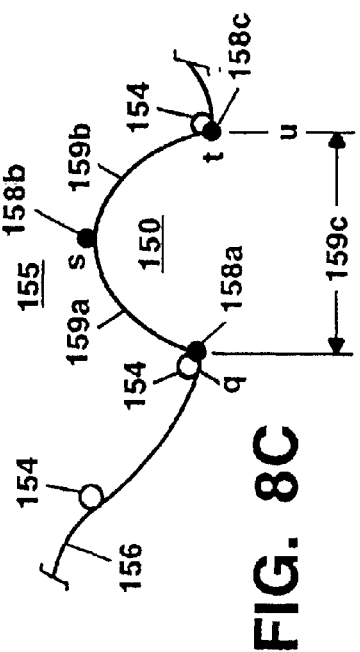
FIG. 8E
FIG. 8D
FIG. 8B
FIG. 8A
FIG. 8C

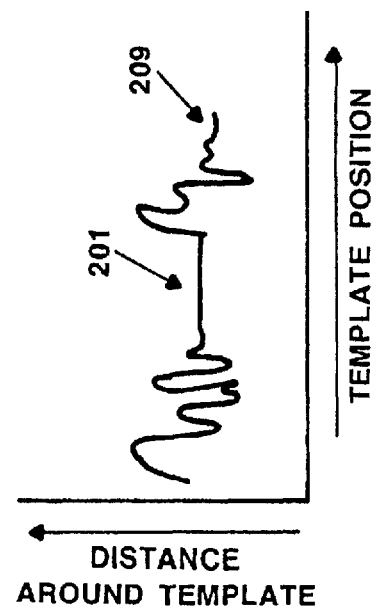
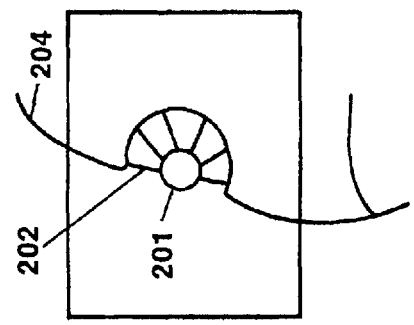
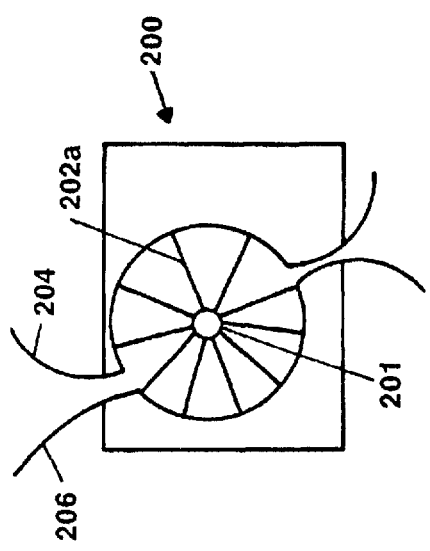
FIG. 9E
FIG. 9G
FIG. 9F

SYSTEM FOR DIGITAL BOWEL SUBTRACTION AND POLYP DETECTION AND RELATED TECHNIQUES

RELATED APPLICATIONS

This application claims priority under 35 U.S.C. §119(e) from U.S. application Ser. No. 60/195,654 filed Apr. 7, 2000 which application is hereby incorporated herein by reference in its entirety.

GOVERNMENT RIGHTS

Not Applicable.

FIELD OF THE INVENTION

This invention relates generally to colonoscopy techniques and more particularly to a system for processing the image of a bowel to remove bowel contents from the image and for detecting polyps in the digital image.

BACKGROUND OF THE INVENTION

As is known in the art, a colonoscopy refers to a medical procedure for examining a colon to detect abnormalities such as polyps, tumors or inflammatory processes in the anatomy of the colon. The colonoscopy is a procedure which consists of a direct endoscopic examination of the colon with a flexible tubular structure known as a colonoscope which has fiber optic or video recording capabilities at one end thereof. The colonoscope is inserted through the patient's anus and directed along the length of the colon, thereby permitting direct endoscopic visualization of colon polyps and tumors and in some cases, providing a capability for endoscopic biopsy and polyp removal. Although colonoscopy provides a precise means of colon examination, it is time-consuming, expensive to perform, and requires great care and skill by the examiner. And, the procedure also requires thorough patient preparation including ingestion of purgatives and enemas, and usually a moderate anesthesia. Moreover, since colonoscopy is an invasive procedure, there is a significant risk of injury to the colon and the possibility of colon perforation and peritonitis, which can be fatal.

To overcome these drawbacks, the virtual colonoscopy was conceived. A virtual colonoscopy makes use of images generated by computed tomography (CT) imaging systems (also referred to as computer assisted tomography (CAT) imaging systems). In a CT (or CAT) imaging system, a computer is used to produce an image of cross-sections of regions of the human body by using measure attenuation of X-rays through a cross-section of the body. In a virtual colonoscopy, the CT imaging system generates two-dimensional images of the inside of an intestine. A series of such two-dimensional images can be combined to provide a three-dimensional image of the colon. While this approach does not require insertion of an endoscope into a patient and thus avoids the risk of injury to the colon and the possibility of colon perforation and peritonitis, the approach still requires thorough patient preparation including purgatives and enemas. Generally, the patient must stop eating and purge the bowel by ingesting (typically by drinking) a relatively large amount of a purgative. Another problem with the virtual colonoscopy approach is that, the accuracy of examinations and diagnosis using virtual colonoscopy techniques is not as accurate as is desired. This is due, at least in part, to the relatively large number of images the examiner (e.g. a doctor) must examine to determine if a polyp, tumor or an abnormality exists in the colon.

It would, therefore, be desirable to provide a virtual colonoscopy technique which removes the need for bowel cleansing. It would also be desirable to provide a virtual colonoscopy technique which removes the need for thorough patient preparation.

It would further be desirable to provide a technique which increases the accuracy of examinations and diagnosis using virtual colonoscopy. It would be further desirable to provide a technique which reduces the number of images an examiner (e.g. a doctor) must examine to determine if a polyp, tumor or an abnormality exists in the colon. It would be further desirable to provide a technique for automatic detection of polyps, tumors or other abnormalities in the colon.

SUMMARY OF THE INVENTION

In accordance with the present invention, an apparatus for performing a virtual colonoscopy includes a system for generating digital images, a storage device for storing the digital images, a digital bowel subtraction processor coupled to receive images of a colon from the storage device and for processing the received digital images of the colon to digitally remove the contents of the colon from the image. With this particular arrangement, a system which provides accurate results without the need for thorough patient preparation (e.g. without the need for bowel cleansing) is provided. The digital bowel subtraction processor (DBSP) receives image data from the image database and processes the image data to digitally remove the contents of the bowel from the digital image. The DBSP can then store the image back into the image database. Since the DBSP digitally subtracts the contents of the bowel, the patient undergoing the virtual colonoscopy need not purge the bowel in the conventional manner which is know to be unpleasant to the patient. The system can further include an automated polyp detection processor coupled to receive images of a colon from the storage device and for processing the received digital images of the colon to detect polyps in the colon image.

The automated polyp detection processor (APDP) receives image data from the image storage device (which may be provided as an image database, for example) and processes the image data to detect and/or identify polyps, tumors, inflammatory processes, or other irregularities in the anatomy of the colon. The APDP can thus pre-screen each image in the database such that an examiner (e.g. a doctor) need not examine every image but rather can focus attention on a subset of the images possibly having polyps or other irregularities. Since the CT system generates a relatively large number of images for each patient undergoing the virtual colonoscopy, the examiner is allowed more time to focus on those images in which it is most likely to detect a polyp or other irregularity in the colon. The APDP can process images which have been generated using either conventional virtual colonoscopy techniques (e.g. techniques in which the patient purges the bowel prior to the CT scan) or the APDP can process images in which the bowel contents have been digitally subtracted (e.g. images which have been generated by DBSP).

In accordance with a still further aspect of the present invention a technique for digital bowel subtraction includes the steps of applying a threshold function to the image data and selecting all image elements above the threshold for further processing, applying a gradient to the original image to identify "shoulder regions" and then performing an image dilation step on the shoulder region (i.e. an expansion is performed on selected pixels in the shoulder region). The bowel contents are digitally subtracted based on the gradient analysis. Thus, after selecting and dilating the gradient the subtraction of the bowel contents is performed. Mathematically this can be represented as Subtracted Image Values≈Original Image Values−(Threshold Values+Gradient Values).

In accordance with a still further aspect of the present invention a technique for digital bowel subtraction includes the steps of scanning across a matrix of digital values which represents an image, identifying regions corresponding to regions of a colon, identifying regions corresponding to regions of air and bowel contents in the colon and subtracting one region from the other to provide an image with the bowel contents removed. With this technique, a raster based searching method is provided. By scanning an image in a raster pattern and applying threshold values in a predetermined logic sequence, pixels representing air which are located proximate pixels representing bowel wall are found. Once a region corresponding to a boundary region between bowel contents and a bowel wall is found, the pixels which represent the bowel contents can be subtracted from the image. In one embodiment, the pixels representing the bowel contents are subtracted from the image by setting the values of the pixels to value corresponding to air.

In accordance with a still further aspect of the present invention a technique for automatic polyp detection includes the steps of generating a polyp template by obtaining a CT image which includes a polyp and excising the polyp from the image and using the excised polyp image as the template. Next, a portion of a CT image is selected and a polyp identification function is applied to the selected portion of the CT image. Next, a correlation is performed between the output of the identification function and the image. With this particular arrangement, a technique for automated polyp detection is provided.

In accordance with a still further aspect of the present invention, a second technique for automatic polyp detection includes the steps of moving a test element along a boundary of a bowel. When the test element is rolled around the bowel perimeter, the changes in direction of the test element are detected as the changes occur. The features of the bowel perimeter are classified based upon the path of the test element. Thus, an advance knowledge of the geometric characteristic of the polyp or other irregularity being detected is required. The process of classifying the features of the bowel are accomplished by marking three points where turns exist. The points are selected by looking at the changes in slope (e.g. the derivative). Next the distances between the marked points are computed and the ratios between the distances are used to identify bowel features or characteristics of the bowel. In one embodiment, the test element is provided having a circular shape and thus is referred to as a virtual rolling ball, a virtual ball, or more simply a ball.

In accordance with a still further aspect of the present invention, a third technique for automatic detection of structures, including but not limited to polyps, includes the steps of applying a template to a segmented bowel image corresponding to the bowel perimeter and computing the distances between points on the template perimeter and the perimeter bowel points present within a window. Next, a determination is made as to whether the distances are equal. When the template becomes centered within a lesion, then the distances from one or more points on the template to bowel boundary points of the structure (e.g. a lesion)become substantially equal. The distances may be measured from a number of points on the template. For example, a center point of the template, perimeter points of the template or other points on the template may be used. The particular points to use on the template are selected in accordance with a variety of factors including but not limited to the template shape and the physical characteristics (e.g. shape) of structure being detected. To make a determination of when the computed distances are substantially equal, a standard deviation of a group of those distances can be computed. The template location at which the standard deviation values approach a minimum value corresponds to a location at which a structure having a shape similar to the template shape exists. Alternatively, an average distance from a point on the template (e.g. a template center point) to the perimeter of the boundary structure (e.g. a bowel wall) can be computed. In this case, a location at which a structure having a shape similar to the template shape exists can be found when the average distance from the point on the template to the boundary structure perimeter points reaches a minimum value. The above process can be carried out in one plane or in three orthogonal planes. The point where the standard deviation of a group of those distances approaches a minimum value is the point which should be marked as a center of a suspected lesion. In the case where the technique is run in three orthogonal planes, those lesions that were tagged in 2 of 3 or 3 of 3 planes can be finally tagged as suspicious regions. This technique can thus be used to distinguish a fold from a polyp. With this particular arrangement, a technique which searches for patterns of distance is provided. The technique is thus relatively computationally expensive but it is also relatively rigorous. One advantage of this technique is that does not matter how large the template is relative to the polyp so one scanning works for all lesions.

BRIEF DESCRIPTION OF THE DRAWINGS

The foregoing features of the invention, as well as the invention itself may be more fully understood from the following detailed description of the drawings, in which:

FIGS. 8A–8H are examples of automatic polyp detection in a CT image of a bowel using the rolling ball technique;

FIGS. 9A–9G are examples of automatic polyp detection in a CT image of a bowel using the distance matching technique.

DESCRIPTION OF THE PREFERRED EMBODIMENTS

Figure 1:
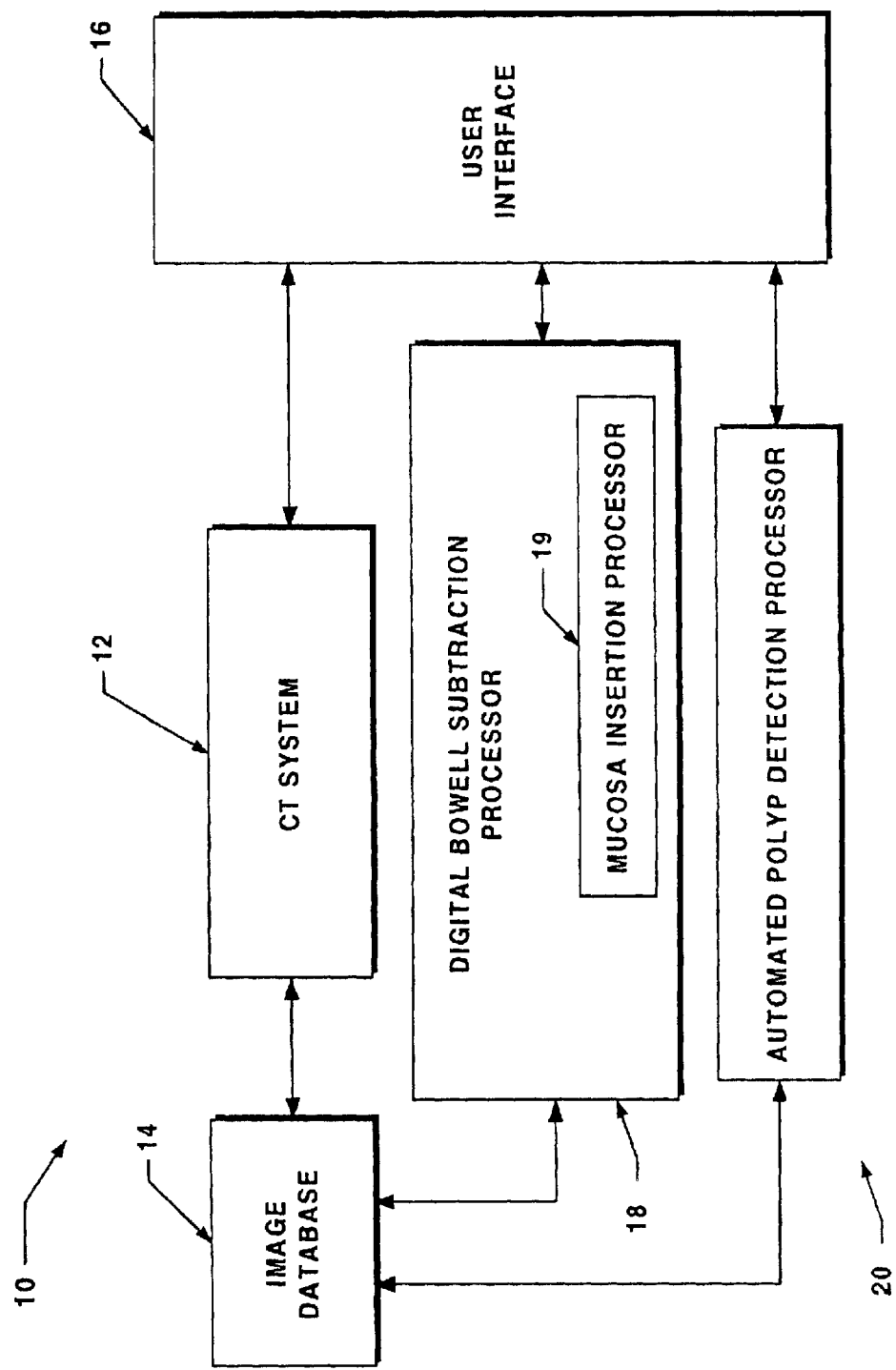
FIG. 1 is a block diagram of a system for digital bowel subtraction and automatic polyp detection.
Figure 1B:
FIGS. 1A–1D a series of views illustrating a digital image of a bowel before and after processing via a digital bowel subtraction processor.

Before describing a virtual colonoscopy system which includes a digital bowel subtraction processor (DBSP) and/or automated polyp detection processor (APDP) and the operations performed to digital cleanse a bowel and automatically detect a polyp, some introductory concepts and terminology are explained.

A computed tomography (CT) system generates signals which can be stored as a matrix of digital values in a storage device of a computer or other digital processing device. As described herein, the CT image is divided into a two-dimensional array of pixels, each represented by a digital word. One of ordinary skill in the art will recognize that the techniques described herein are applicable to various sizes and shapes of arrays. The two-dimensional array of pixels can be combined to form a three-dimensional array of pixels. The value of each digital word corresponds to the intensity of the image at that pixel. Techniques for displaying images represented in such a fashion, as well as techniques for passing such images from one processor to another, are known.

As also described herein, the matrix of digital data values are generally referred to as a "digital image" or more simply an "image" and may be stored in a digital data storage device, such as a memory for example, as an array of numbers representing the spatial distribution of energy at different wavelengths in a scene.

Each of the numbers in the array correspond to a digital word typically referred to as a "picture element" or a "pixel" or as "image data." The image may be divided into a two dimensional array of pixels with each of the pixels represented by a digital word. Thus, a pixel represents a single sample which is located at specific spatial coordinates in the image.

It should be appreciated that the digital word is comprised of a certain number of bits and that the techniques of the present invention can be used on digital words having any number of bits. For example, the digital word may be provided as an eight-bit binary value, a twelve bit binary value, a sixteen but binary value, a thirty-two bit binary value, a sixty-four bit binary value or as a binary value having any other number of bits.

It should also be noted that the techniques described herein may be applied equally well to either grey scale images or color images. In the case of a gray scale image, the value of each digital word corresponds to the intensity of the pixel and thus the image at that particular pixel location. In the case of a color image, reference is sometimes made herein to each pixel being represented by a predetermined number of bits (e.g. eight bits) which represent the color red (R bits), a predetermined number of bits (e.g. eight bits) which represent the color green (G bits) and a predetermined number of bits (e.g. eight bits) which represent the color blue (B-bits) using the so-called RGB color scheme in which a color and luminance value for each pixel can be computed from the RGB values. Thus, in an eight bit color RGB representation, a pixel may be represented by a twenty-four bit digital word.

It is of course possible to use greater or fewer than eight bits for each of the RGB values. It is also possible to represent color pixels using other color schemes such as a hue, saturation, brightness (HSB) scheme or a cyan, magenta, yellow, black (CMYK) scheme. It should thus be noted that the techniques described herein are applicable to a plurality of color schemes including but not limited to the above mentioned RGB, HSB, CMYK schemes as well as the Luminosity and color axes a & b (Lab) YUV color difference color coordinate system, the Karhunen-Loeve color coordinate system, the retinal cone color coordinate system and the X, Y, Z scheme.

Reference is also sometimes made herein to an image as a two-dimensional pixel array. An example of an array size is size 512×512. One of ordinary skill in the art will of course recognize that the techniques described herein are applicable to various sizes and shapes of pixel arrays including irregularly shaped pixel arrays.

An "image region" or more simply a "region" is a portion of an image. For example, if an image is provided as a 32×32 pixel array, a region may correspond to a 4×4 portion of the 32×32 pixel array.

In many instances, groups of pixels in an image are selected for simultaneous consideration. One such selection technique is called a "map" or a "local window." For example, if a 3×3 subarray of pixels is to be considered, that group is said to be in a 3×3 local window. One of ordinary skill in the art will of course recognize that the techniques described herein are applicable to various sizes and shapes of local windows including irregularly shaped windows.

It is often necessary to process every such group of pixels which can be formed from an image. In those instances, the local window is thought of as "sliding" across the image because the local window is placed above one pixel, then moves and is placed above another pixel, and then another, and so on. Sometime the "sliding" is made in a raster pattern. It should be noted, though, that other patterns can also be used.

It should also be appreciated that although the detection techniques described herein are described in the context of detecting polyps in a colon, those of ordinary skill in the art should appreciate that the detection techniques can also be used search for and detect structures other than polyps and that the techniques may find application in regions of the body other than the bowel or colon.

Referring now to FIG. 1, a system for performing virtual colonoscopy 10 includes a computed tomography (CT) imaging system 12 having a database 14 coupled thereto. As is known, the CT system 10 produces two-dimensional images of cross-sections of regions of the human body by measuring attenuation of X-rays through a cross-section of the body. The images are stored as digital images in the image database 14. A series of such two-dimensional images can be combined using known techniques to provide a three-dimensional image of the colon. A user interface 16 allows a user to operate the CT system and also allows the user to access and view the images stored in the image database.

A digital bowel subtraction processor (DBSP) 18 is coupled to the image database 14 and the user interface 16. The DBSP receives image data from the image database and processes the image data to digitally remove the contents of the bowel from the digital image. The DBSP can then store the image back into the image database 14. The particular manner in which the DBSP processes the images to subtract or remove the bowel contents from the image will be described in detail below in conjunction with FIGS. 2–6. Suffice it here to say that since the DBSP digitally subtracts or otherwise removes the contents of the bowel from the image provided to the DBSP, the patient undergoing the virtual colonoscopy need not purge the bowel in the conventional manner which is know to be unpleasant to the patient.

The DBSP 18 may operate in one of at least two modes. The first mode is referred to a raster mode in which the DBSP utilizes a map or window which is moved in a predetermined pattern across an image. In a preferred embodiment, the pattern corresponds to a raster pattern. The window scans the entire image while threshold values are applied to pixels within the image in a predetermined logic sequence. The threshold process assesses whether absolute threshold values have been crossed and the rate at which they have been crossed. The raster scan approach looks primarily for "air" pixels proximate (including adjacent to) bowel pixels. The processor examines each of the pixels to locate native un-enhanced soft tissue, As a boundary between soft tissue (e.g. bowel wall) and bowel contents is established, pixels are reset to predetermined values depending upon which side of the boundary on which they appear.

The second mode of operation for the DBSP 18 is the so-called gradient processor mode. In the gradient processor mode, a soft tissue threshold (ST) value, an air threshold (AT) value and a bowel threshold (BT) value are selected. A first mask is applied to the image and all pixels having values greater than the bowel threshold value are marked. Next, a gradient is applied to the pixels in the images to identify pixels in the image which should have air values and bowel values. The gradient function identifies regions having rapidly changing pixel values. From experience, one can select bowel/air and soft tissue/air transition regions in an image by appropriate selection of the gradient threshold. The gradient process uses a second mask to capture a first shoulder region in a transition region after each of the pixels having values greater than the BT value have been marked.

Once the DBSP 18 removes the bowel contents from the image, there exists a relatively sharp boundary and gradient when moving from the edge of the bowel wall to the "air" of the bowel lumen. This is because the subtraction process results in all of the subtracted bowel contents having the same air pixel values. Thus, after the subtraction, there is a sharp boundary and gradient when moving from the edge of the bowel wall to the "air" of the bowel lumen. In this context, "air" refers to the value of the image pixels which been reset to a value corresponding to air density. If left as is, this sharp boundary (and gradient) end up inhibiting the 3D endoluminal evaluation of the colon model since sharp edges appear as bright reflectors in the model and thus are visually distracting.

A mucosa insertion processor 19 is used to further process the sharp boundary to lesson the impact of or remove the visually distracting regions. The sharp edges are located by applying a gradient operator to the image from which the bowel contents have been extracted. The gradient operator may be similar to the gradient operator used to find the boundary regions in the gradient subtractor approach described herein. The gradient threshold used in this case, however, typically differs from that used to establish a boundary between bowel contents and a bowel wall.

The particular gradient threshold to use can be empirically determined. Such empirical selection may be accomplished, for example, by visually inspecting the results of gradient selection on a set of images detected under similar scanning and bowel preparation techniques and adjusting gradient thresholds manually to obtain the appropriate gradient (tissue transition selector) result.

The sharp edges end up having the highest gradients in the subtracted image. A constrained gaussian filter is then applied to these boundary (edge) pixels in order to "smooth" the edge. The constraint is that the smoothing is allowed to take place only over a predetermined width along the boundary. The predetermined with should be selected such that the smoothing process does not obscure any polyp of other bowel structures of possible interest. In one embodiment the predetermined width corresponds to a width of less than ten pixels. In a preferred embodiment, the predetermined width corresponds to a width in the range of two to five pixels and in a most preferred embodiment, the width corresponds to a width of three pixels. The result looks substantially similar and in some cases indistinguishable from the natural mucosa seen in untouched bowel wall, and permits an endoluminal evaluation of the subtracted images.

Also coupled between the image database 14 and the user interface 16 is an automated polyp detection processor (APDP) 20. The APDP 20 receives image data from the image database and processes the image data to detect and/or identify polyps, tumors, inflammatory processes, or other irregularities in the anatomy of the colon. The APDP 20 can thus pre-screen each image in the database 14 such that an examiner (e.g. a doctor) need not examine every image but rather can focus attention on a subset of the images possibly having polyps or other irregularities. Since the CT system 10 generates a relatively large number of images for each patient undergoing the virtual colonoscopy, the examiner is allowed more time to focus on those images in which the examiner is most likely to detect a polyp or other irregularity in the colon. The particular manner in which the APDP 20 processes the images to detect and/or identify polyps in the images will be described in detail below in conjunction with FIGS. 7–9. Suffice it here to say that the APDP 20 can be used to process two-dimensional or three-dimensional images of the colon. It should also be noted that APDP 20 can process images which have been generated using either conventional virtual colonoscopy techniques (e.g. techniques in which the patient purges the bowel prior to the CT scan) or the APDP 20 can process images in which the bowel contents have been digitally subtracted (e.g. images which have been generated by DBSP 18).

It should also be appreciated that polyp detection system 20 can provide results generated thereby to an indicator system which can be used to annotate (e.g. by addition of a marker, icon or other means) or otherwise identify regions of interest in an image (e.g. by drawing a line around the region in the image, or changing the color of the region in the image) which has been processed by the detection system 20.

Referring now to FIGS. 1A–1D in which like elements are provided having like reference designations throughout the several views, a series of images 19a–19d illustrating a bowel before (FIGS. 1A, 1B) and after (FIGS. 1C, 1D) processing via the DBSP 18 (FIG. 1) are shown.

Figure 1A:
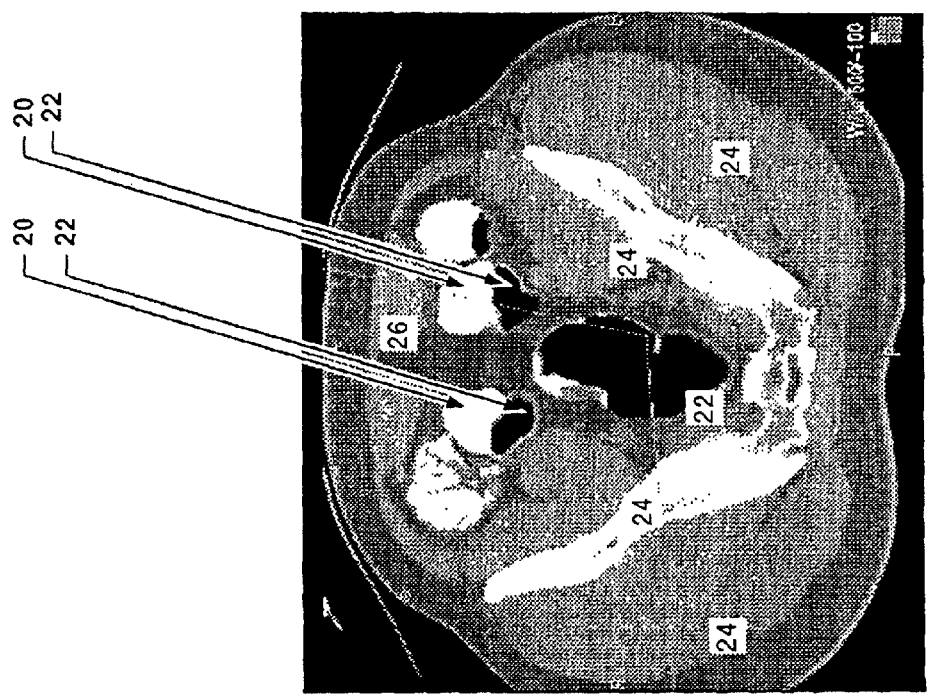
Figure 1D:
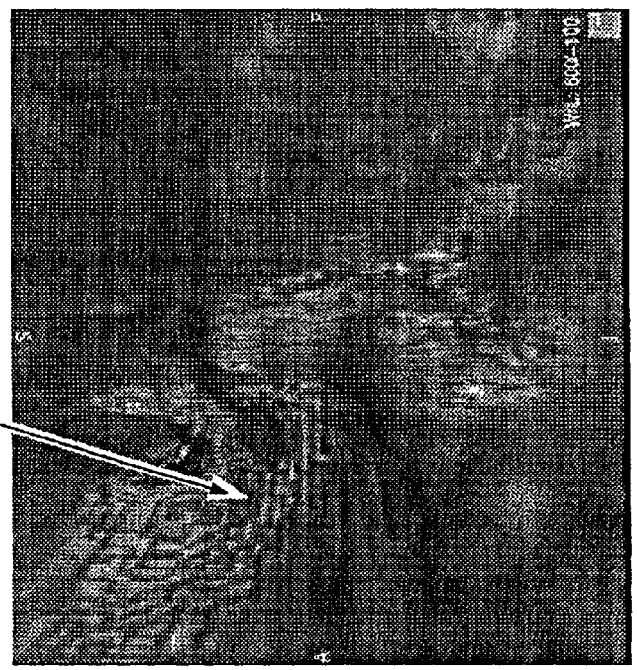

In FIG. 1A, the image 19a corresponds to a single slice of a CT scan. The image 19a includes a plurality of opacified bowel contents 20 (shown as light colored regions) and regions of air 22 (shown as dark colored regions). The image 19a also includes regions 24 which correspond to native soft tissue and regions 26 which correspond to portions of a bowel wall.

Image 19b (FIG. 1B) is three-dimensional view of the colon formed from a series of single slice CT scans. The opacified bowel contents 20 are shown. The opacified bowel contents 20 impairing the view of the bowel wall and thus limit the ability to detect regions of interest along the bowel wall.

Figure 1C:
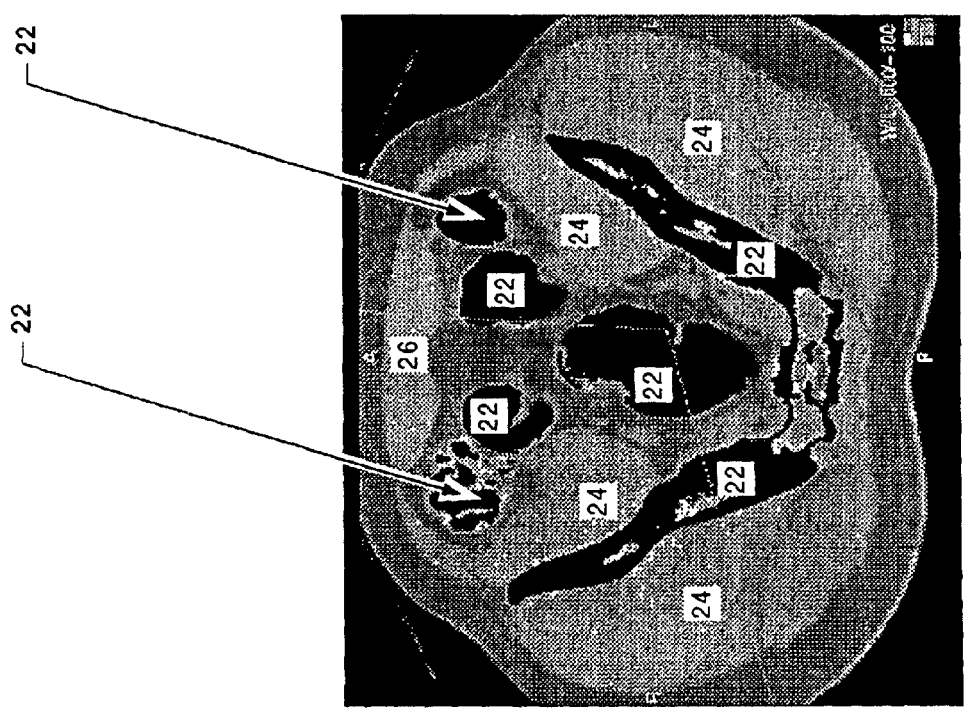

In FIG. 1C, single slice CT scan image 19c is the same as image 19a except that the bowel contents present in the image 19a (FIG. 19A) have been digitally subtracted from the image 19a. The image 19c does not include the opacified bowel contents present in FIG. 19A. Rather the bowel contents 20 (FIG. 19A) have been replaced by regions 22 (shown as dark colored regions) corresponding to air. The image 19c also includes the native soft tissue and bowel wall regions 24, 26 respectively.

As discussed above, the DBSP 18 receives an image of a section of a bowel and digitally subtracts the contents 20 of the bowel section. Here the operation is performed on a two-dimensional image and a series of such two-dimensional images (each of which has been processed by the DBSP 18) can be combined to provide a three-dimensional image of the bowel section. Such two-dimensional and three-dimensional images can then be processed via the APDP 20 (FIG. 1) to detect polyps, tumors, inflammatory processes, or other irregularities in the anatomy of the colon.

FIGS. 2–9 are a series of flow diagrams showing the processing performed by a processing apparatus which may, for example, be provided as part of a virtual colonoscopy system 10 such as that described above in conjunction with FIG. 1 to perform digital bowel subtraction and automated polyp detection. The rectangular elements (typified by element 30 in FIG. 2), herein denoted "processing blocks," represent computer software instructions or groups of instructions. The diamond shaped elements (typified by element 64 in FIG. 5), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figure 2:
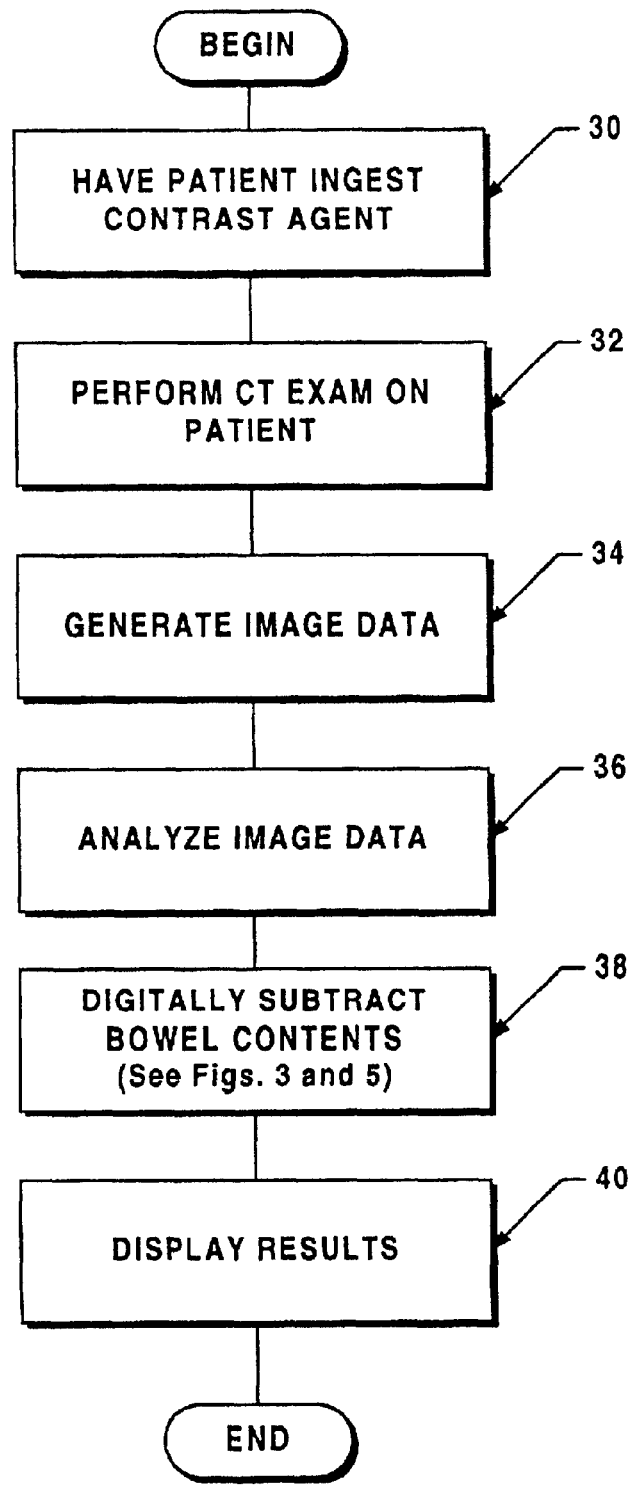
FIG. 2 is a flow diagram showing the steps in a virtual colonoscopy performed using digital bowel subtraction.

Turning now to FIG. 2, the steps in a virtual colonoscopy are shown. As shown in step 30, the virtual colonoscopy process begins by placing a contract agent in the region of the colon in which the CT scan will be performed. Typically, the patient ingests the contract agent. It should be appreciated however, that any technique for placing the contrast agent in the bowel may also be used. The contrast agent may be taken in small amounts with meals beginning approximately 48 hours or so prior to a scheduled CT exam. The contrast agent can be of any of the commercially available types such as Gastrograffin, Barium or Oxilan, for example.

Next, as show in step 32, the CT exam takes place and images of a body region (e.g. an entire abdomen) are generated as shown in step 34.

The image data is then sent to an analysis system and analyzed as shown in step 36. One or more images are selected for analysis (can be a single slice or a series of slices). This can be accomplished using commercially available systems such as the Vitrea System available through Vital Images, Inc. Minneapolis, Minn.

Then, as shown in step 38, the contents of the bowel are digitally subtracted from the CT images. The digital subtraction step can be performed using either of the techniques described below in conjunction with FIGS. 3 and 5 below.

After the digital subtraction step, the results of the bowel images having the contents thereof digitally removed are displayed as shown in step 40.

Figure 3:
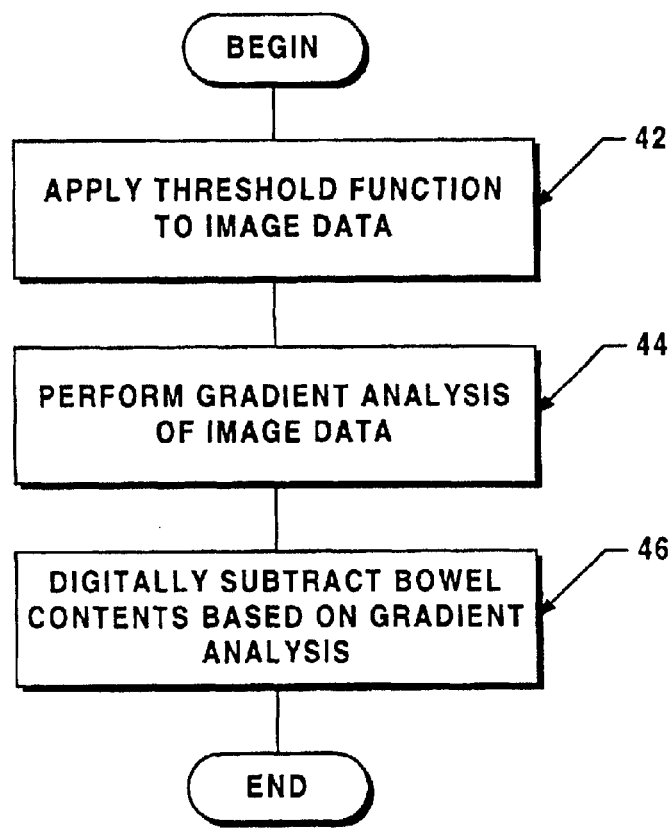
FIG. 3 is a flow diagram showing the steps in a first method for performing digital bowel subtraction.

Referring now to FIG. 3, a first technique for digitally subtracting the contents of a bowel utilizes functions from the so-called "toolbox" found in the MATLAB computer program (available through The Math Works, Natick, Mass.). This technique begins by applying a threshold function to the image data and selecting all image elements above the threshold.

Next as shown in step 44, a gradient is applied to the original image to identify "shoulder regions." One the should regions are identified, an image dilation step is performed on the shoulder region (i.e. an expansion is performed on selected pixels in the shoulder region). The gradient functions can be provided as any number of functions including but not limited to the Roberts or Sobel gradient functions. Generally, in those regions in which the air water interfaces are horizontal, it is desirable to use a horizontal gradient.

Next, as shown in step 46, the bowel contents are digitally subtracted based on the gradient analysis. Thus, after selecting and dilating the gradient, the subtraction of the bowel contents is performed. Mathematically this can be represented as:

Subtracted Image Values≈Original Image Values−(Threshold Values+Gradient Values)

in which:

| | |
|---|---|
| Original Image Values = | the values of the digital image as measured by the CT System and massaged as necessary but prior to DBS processing |
| Threshold Values = | a selected threshold value |
| Gradient Values = | values resultant from the selected gradient function |

Figure 4:
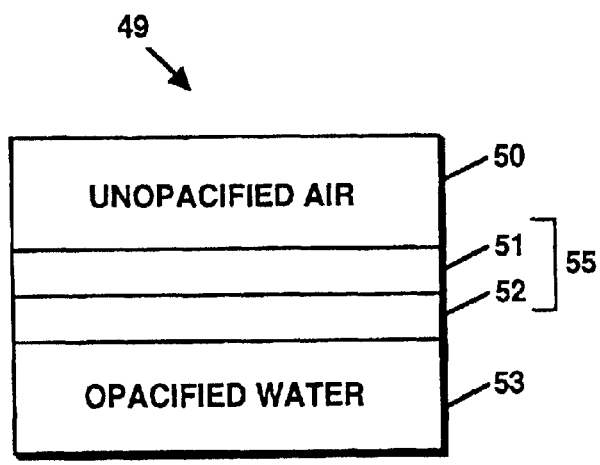
FIG. 4 is a diagram showing the volume averaging area in a portion of a colon.
Figure 4A:
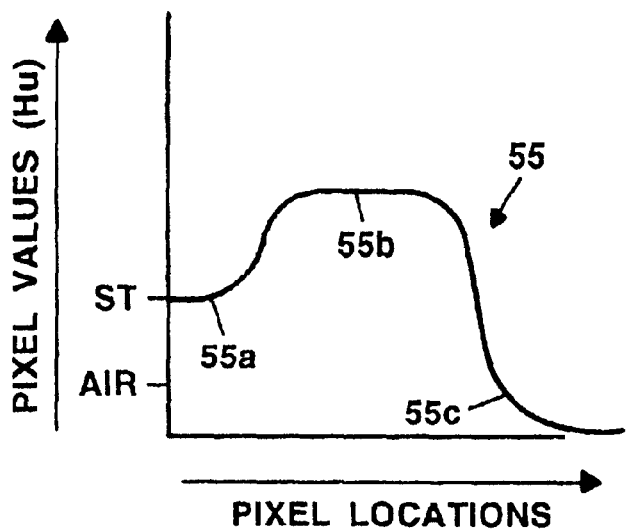
FIGS. 4A–4C are plots of pixel values vs. pixel locations in the formation of a bowel wall/air boundary.
Figure 4B:
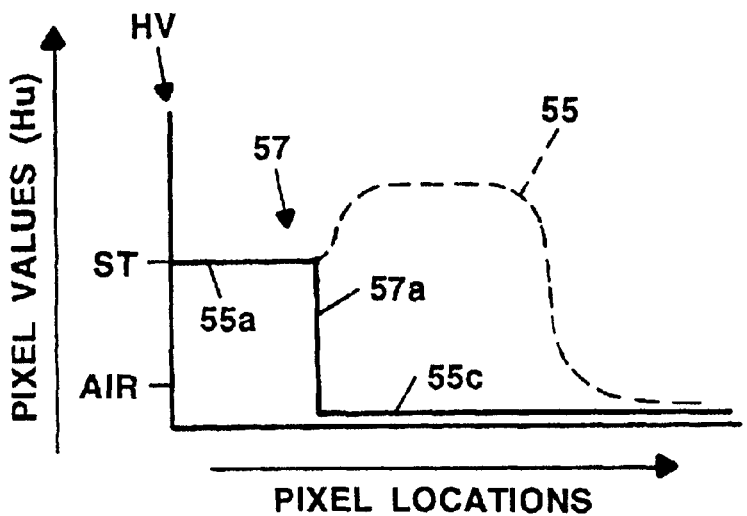
Figure 4C:
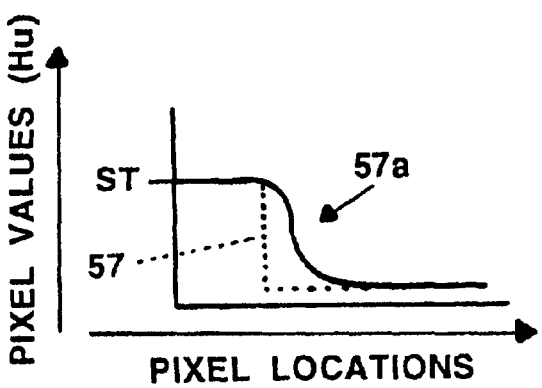

Referring briefly to FIGS. 4–4C, an image of a bowel portion 49 (FIG. 4) includes an unopacified region 50 (FIG. 4), and an opacified region 53 (FIG. 4) and a volume averaging region comprised of sections 51, 52 (FIG. 4). The contrast agent ingested increases the contrast between the bowel contents (represented by opacified region 53) and air (represented by the unopacified region 50). The regions 51, 52 correspond to a boundary area between the unopacified region 53 and the opacified region 53. That is, a clearly defined boundary does not exist between the unopacified and opacified regions 49, 53.

Referring now to FIG. 4A, a plot 55 of pixel values in Hounsfield Units (HU) vs. pixel locations in a CT image reveals a first region 55a corresponding to a soft tissue region, a second region 55b corresponding to an opacified bowel contents region and a third region 55c corresponding to an air region. A transition region thus exists between the soft tissue region 55a and the air region 55c. A gradient function applied to curve 55 produces boundary 57 shown in FIG. 4B. Thus, as shown in FIG. 4B, after application of a gradient function, and subtraction, a relatively sharp transition 57a exists between regions 55a and 55c. It is this transition on which the mucosal insertion processor 19 operates as described above in conjunction with FIG. 1.

As shown in FIG. 4C, after application of the mucosal insertion process, a transition 57a between the soft tissue region 55a and the air region 55c is provided.

Figure 5:
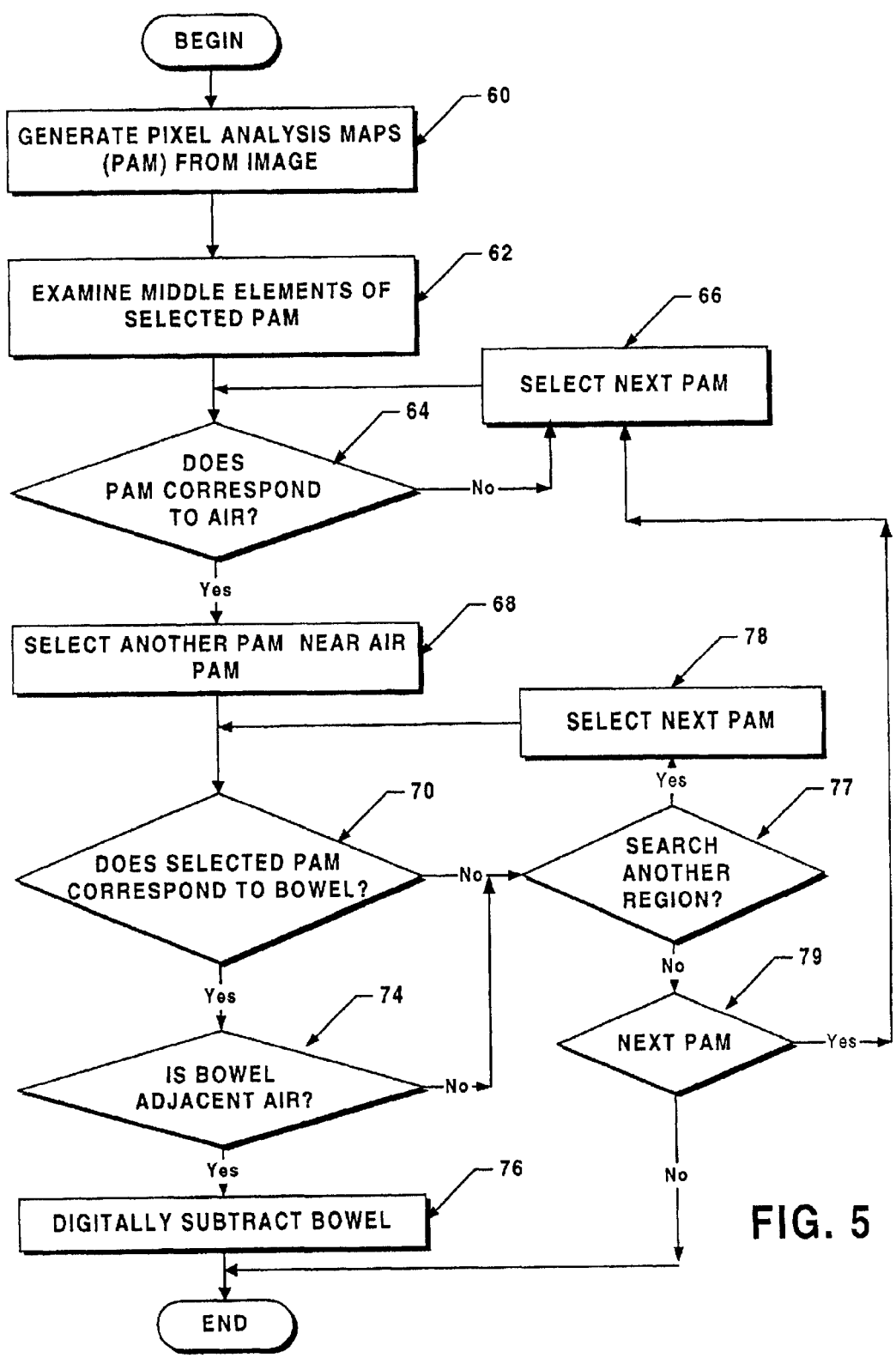
FIG. 5 is a flow diagram showing the steps in a second method for performing digital bowel subtraction.

Referring now to FIG. 5, a second technique for digitally subtracting the contents of a bowel includes the step of generating a pixel analysis map (PAM) from the image as show in step 60. In one particular embodiment, the image is provided as a 512×512 image and the PAM is provided as a 7×8 matrix generated from the image.

The PAM is moved across the image in a raster pattern. As the PAM is moved from location to location across the different regions of the image, steps 62–79 are performed. As shown in step 62, the central elements (upper left (ul), upper right (ur) lower left (ll), lower right (lr) shown in FIG. 5A) of the PAM are the focused of the analysis. Steps 64 and 66 implement a loop in which a search is performed until an air region is found.

Once the air region is found, processing proceeds to step 68 where the area around the air element is searched to locate a bowel region as shown in step 70. If the region corresponds to a bowel region, then processing proceeds to step 74 where it is determined if the bowel region is adjacent to an air region. If the bowel region is adjacent to the air region, then the bowel contents are subtracted as shown in step 76.

If in step 70 a decision is made that the selected PAM does not correspond to bowel, then steps 77 and 78 implement a loop in which a new PAM is selected until a bowel region is found.

This process is repeated for each of the ul, ur, ll, lr in the local window during the raster pattern scan.

Figure 5A:
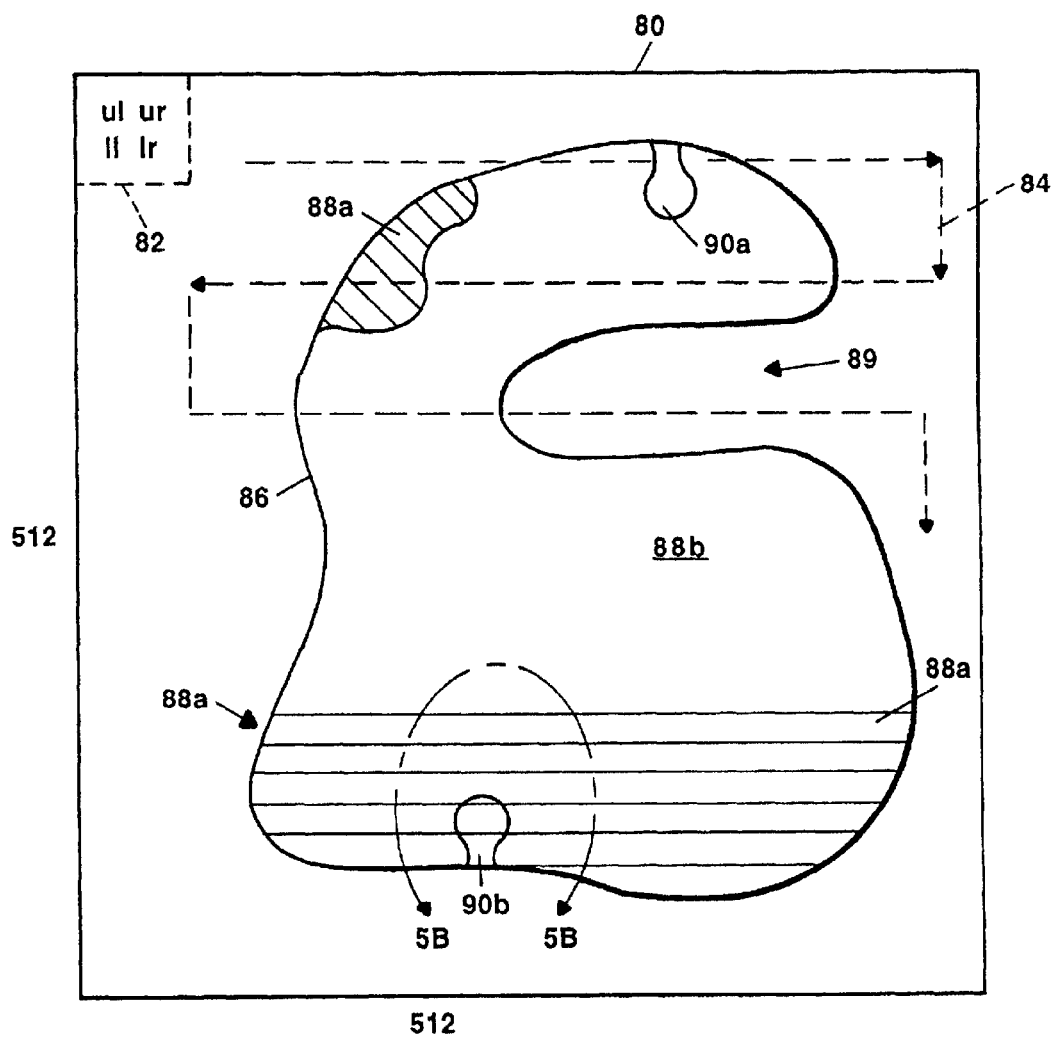
FIG. 5A is diagrammatic view of an image of the type generated by a CT system and having a local window disposed thereover.
Figure 5C:
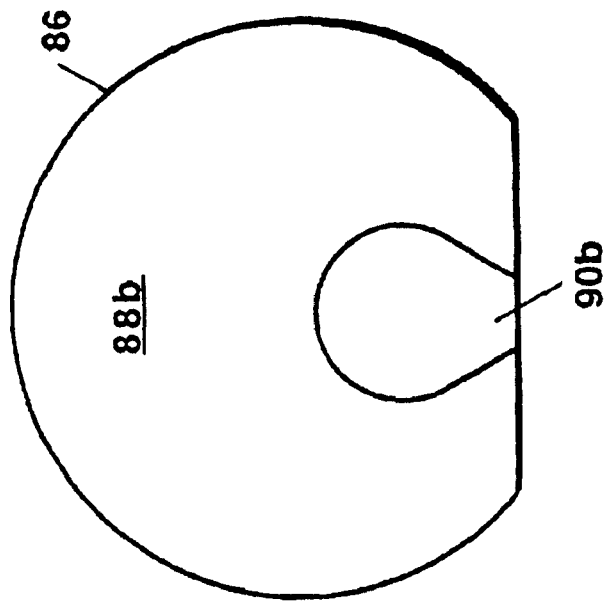
FIG. 5C is a portion of the image shown in FIG. 5A taken along lines 5B—5B after the digital bowel subtraction process and in which the polyp is clearly visible.
Figure 5B:
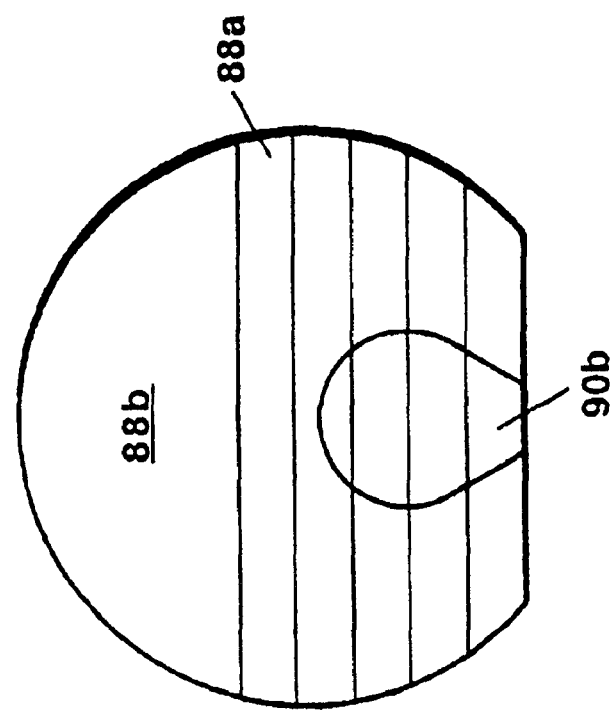
FIG. 5B is a portion of the image shown in FIG. 5A taken along lines 5B—5B showing a polyp obscured by bowel contents.

Referring to FIGS. 5A–5C in which like element are provided having like reference designations throughout the several views, a 512×512 image 80 of the type generated by a CT system for example, is shown having a 7×8 local window 82 disposed thereover. The local window 82 is moved across the image in a raster pattern designated as reference numeral 84. The image 80 is that of a two-dimensional section of a bowel 86. Portions of the bowel 86 have contents 88a (indicated by cross-hatching) and portions 88b correspond to air. The bowel 86 has a fold 89 therein and a plurality of polyps 90a–90b.

As may be more clearly seen in FIG. 5B, in which like elements in FIG. 5A are shown having like reference designations, polyp 90b is obscured by the bowel contents 88a and thus may be difficult to see in an image generated by a CT scan. In particular, such a polyp may be particularly difficult to see in a three-dimensional (3D) view. After the digital subtraction process of the present invention, the image shown in FIG. 5C results. In FIG. 5C, the bowel contents have been removed and the polyp 90b is clearly visible. Thus, when a visual examination of the CT image is conducted, the polyp 90b is exposed and can be easily viewed.

Figure 5D:
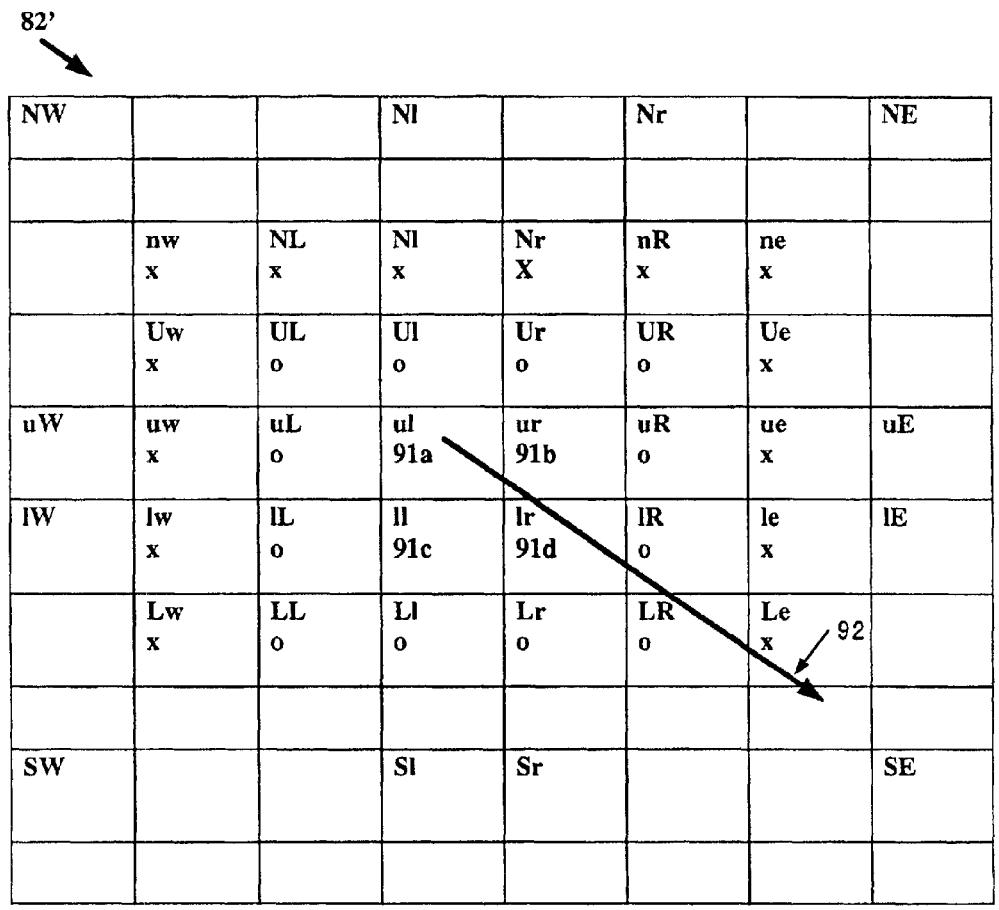
FIG. 5D is a pixel analysis map.

Referring now to FIG. 5D, a pixel analysis map (PAM) 82' includes four central elements 90a–90. As described above, axial digital bowel cleansing can be performed using a marching squares routine to scan through selected regions of an image (e.g. image 80 in FIG. 5A) to reset pixels that fall above a bowel threshold value. The bowel threshold value may be set by the user. One technique uses an air threshold and a soft tissue threshold (both of which are expressed in Hounsfield units) to also segment the bowel mucosal boundary, for use in polyp detection. Segmented pixels (the bowel boundary) are set to a value of 2500.

In the technique, the central four elements 91a–91d of the PAM 82' are used as the marching square. An examination of the image to which the PAM 82' is applied is made by looking out to the far boundaries created by the "L" and "R" level pixels. It should be noted that in FIG. 5D, an "o" designates boundary pixels while an "x" designates outer boundary pixels.

In the technique one of the central pixels is selected (e.g. ul 91a) and one direction is selected (e.g. the SE direction designated by reference line 92. Next, the furthest point away in that direction is examined. In this example, the furthest point corresponds to the point designated SE is selected.

The difference between the value of the ul pixel 91a and the value of the pixel at the location SE is computed. If the difference between the values of the SE and ul is large enough, then one can conclude that a substantial threshold exists. Then points which are closer to the ul pixel than the SE pixel are examined (e.g. pixels at the IL and L1 locations). This process is then repeated for each direction. Once all the directions have been tested, then a new central pixel is selected (e.g. one of pixels 91b–91d) and the process is repeated.

Figure 6:
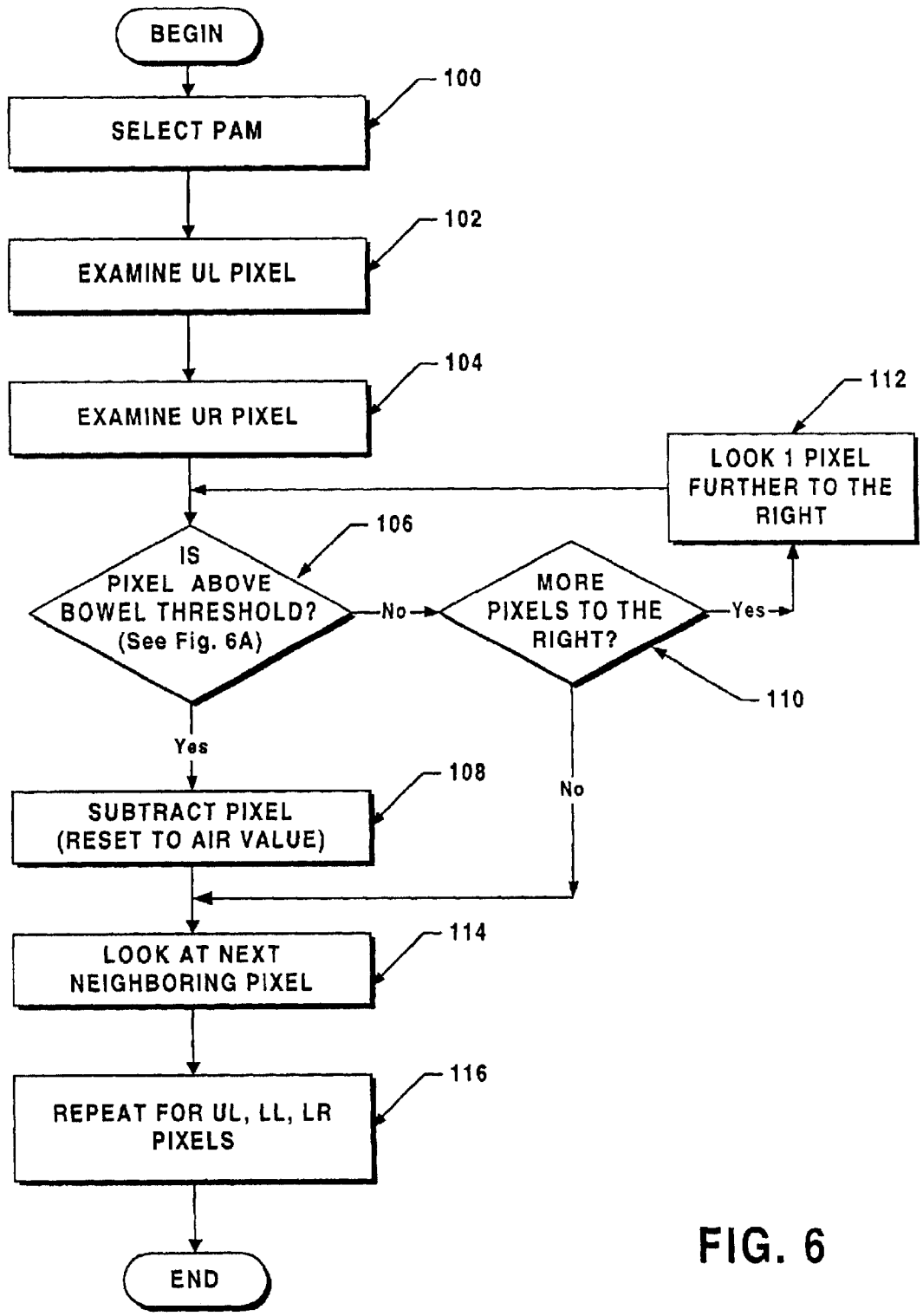
FIG. 6 is a flow diagram showing the steps to digital subtract bowel contents in a region between opacified and non-opacified material in a bowel.

Referring now to FIG. 6, the process of searching around the pixel ul in the local window begins with steps 100 and 102 in which a PAM and one of the elements ul, ur, ll, lr are selected. In the example discussed in FIG. 6, the pixel in location ul is selected as shown in step 102. Thus the processing starts at pixel ul and each of the neighbors to ul (e.g. ur, ll, lr) are examined. It should be appreciated, however, that the process could also start one of the other pixels (i.e. ur, ll, lr) and then the corresponding neighbors would be examined.

Considering first neighbor ur, decision is made as to whether ur is above the bowel threshold as shown in step 106. This process is explained further in conjunction with FIG. 6A. If the value of ur is above the bowel threshold, then processing flows to step 108 in which the pixel value is subtracted to reset the value to the air value. Processing then proceed to step 114 in which the next neighboring pixel is examined.

If in step 106 it is determined that the value of ur is not above the bowel threshold, then a determination is made as to if any more pixel exist to the right of ur as shown in step 110. If such pixels do exist then the system looks one pixel further to the right and processing returns to step 106. If no such pixels exist, then processing proceeds to again to step 114.

The above steps are repeated for each of the pixels ul, ll, lr as indicated in step 116.

Figure 6A:
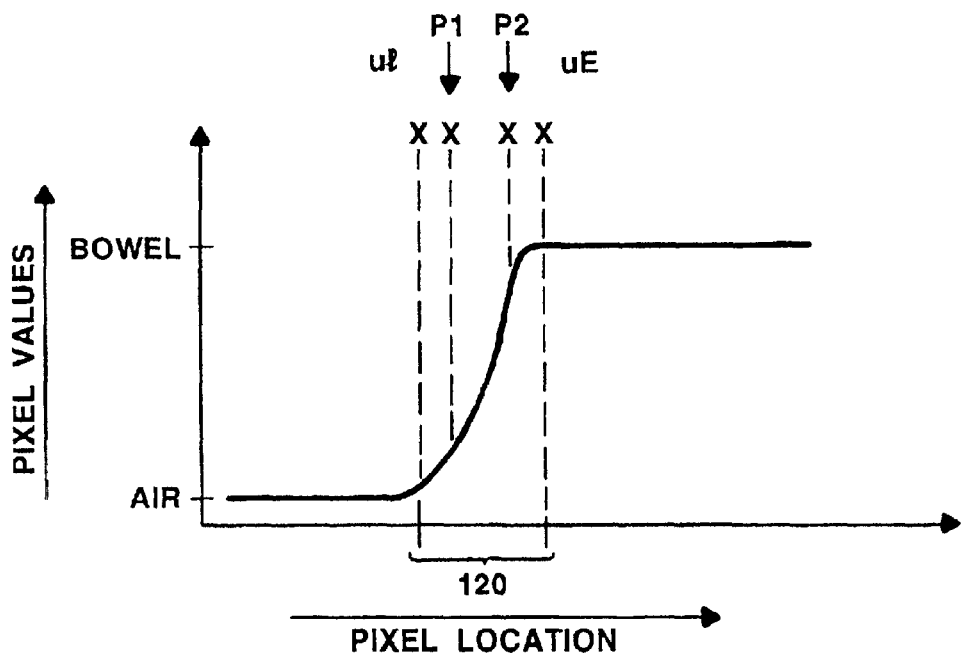
FIGS. 6A and 6B are a series of plots illustrating the threshold process.
Figure 6B:
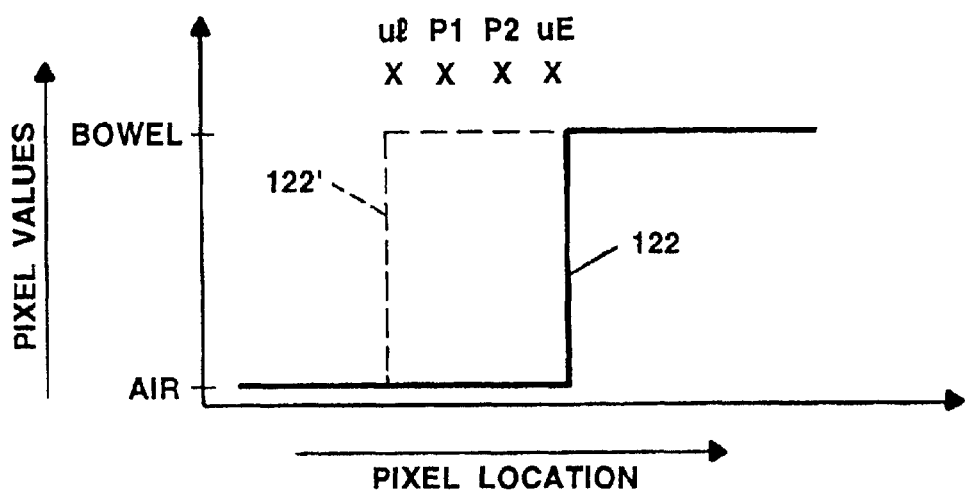

Referring now to FIGS. 6A and 6B, the threshold process is illustrated. There are two parts to the threshold process.

The first part is to determine the air-bowel boundary. The second part requires a decision as to how to treat shoulder region 120.

If the difference between the extreme neighbor uE and the close neighbor P1 is above a gradient threshold, then use that as well as an indication of the air-bowel interface and all values between the starting pixel (i.e. uI in the present example) and the far extreme pixel (i.e. uE in the present example and which is the bowel boundary) are reset to air values. That is, the values for pixels P1, P2 are reset to provide the boundary 122 shown in FIG. 6B. The resultant pixel values (i.e. the reset values for pixels P1, P2) are the values upon which the subtraction is based. The pixel values are preferably set in this way since it is computationally efficient to trigger with the smallest number and because the smallest polyps of interest are bigger than a two pixel distance and the shoulder region is only 1–2 pixels in length. Thus, the direction in which to move the boundary is selected for computationally efficiency.

A second possibility for resetting the pixel values is illustrated by the dashed line 122' in FIG. 6B. In this case, the values of pixels P1, P2 are set to bowel values.

Although the above DBS processes have been described in conjunction with two-dimensional images, it should be appreciated that the same concepts apply equally well to three-dimensional images. That is the concepts can be applied along any axis of an image.

Figure 7:
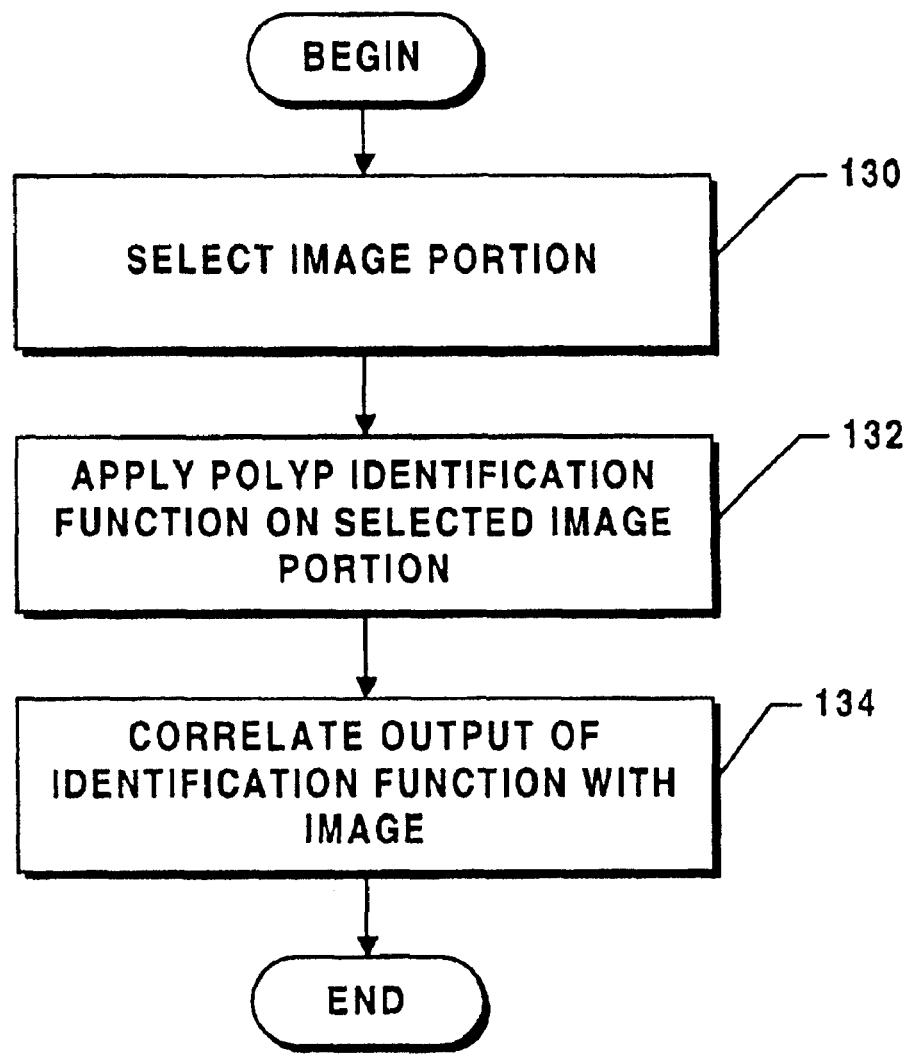
FIG. 7 is a flow diagram showing the steps of a template matching technique to automatically detect a polyp in a CT image of a bowel.

Referring now to FIG. 7, a process for automated polyp detection is described. It should be noted that prior to the processing performed in conjunction with FIG. 7, a polyp template is formed. The polyp template is formed by obtaining a CT image which includes a polyp and excising the polyp from the image. That excised polyp image is then used as the template. Alternatively, one can empirically generate a family of templates that resemble the known morphology and density of polyps (or other structure sought to be detected).

Processing begins with the step 130 in which an image portion is selected. Processing ten proceeds to step 132 in which a polyp identification function is applied to the selected image portion. Next, in step 134, a correlation is performed between the output of the identification function and the image.

The correlation is performed as:

[Correlation Matrix]=2*d* inverse Fourier Transform of [2*d* inverse Fourier Transform(*T*)*2*d* inverse Fourier Transform(*I*)]

in which:
T=the polyp template; and
I=the image.

It should be appreciated that the template matching technique can also be performed by taking a spherical template and applying the spherical template to voxels (i.e. 3D picture elements) formed from a series of two-dimensional images by interpolating values between the images as is known. Also, the original template must be transposed to form an operational molecule. The operational molecule is the template rotated 180 degrees used as a temporary computational transform of the template for the purposes of identifying regions of similarity between the template and the image corresponding to the search for polyps within the image.

It should be noted that if the template is formed from a polyp of a certain size, then the template must scaled to detect polyps of different sizes. This can by done by utilizing a four dimensional process in which the fourth dimension is a scaling of the polyp template. It should also be noted that it may be necessary to modify the polyp template to detect polyps having shapes which are different from spheres.

Figure 8:
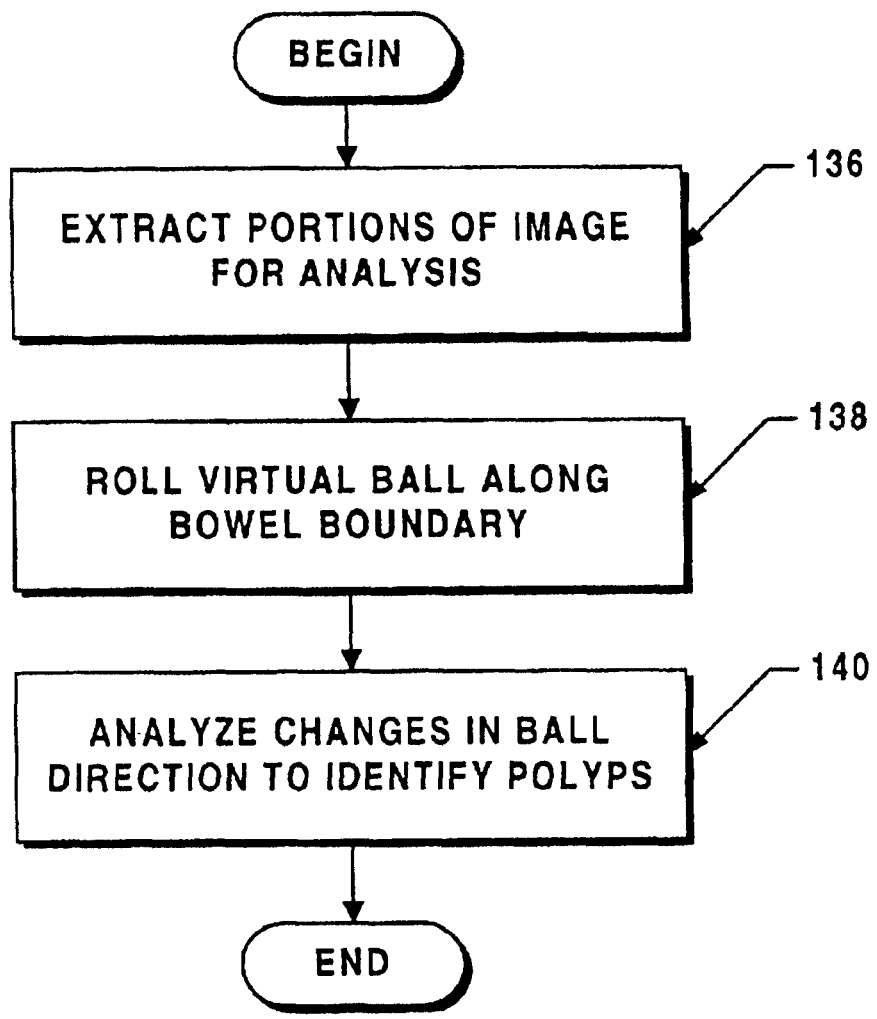
FIG. 8 is a flow diagram showing the steps of a rolling ball technique to automatically detect a polyp in a CT image of a bowel.

Referring now to FIG. 8, a second process for automatic detection of polyps, referred to as the so-called "rolling ball" technique begins with the step of segmenting the image as shown in step 136. In this step all of the image information is taken and certain portions of the image are extracted for use in the analysis. A conventional techniques including but not limited to the so-called "marching cubes" technique can be used in the segmentation step. It should be appreciated that that the segmentation step and all of the steps show in FIG. 8 can be performed on images which have been cleansed using the above-described DBSP process. Alternatively, the segmentation step and all of the steps show in FIG. 8 can be performed on images provided using conventional techniques (e.g. images which have not been cleansed using the DBSP technique).

Next as show in step 138, a virtual ball is rolled along the bowel boundary. When the ball is rolled around the perimeter, the system detects changes in direction of the ball to identify polyps as shown in step 140. In general, the process of classifying the features of the bowel are accomplished by marking three points where turns exist. The points are selected by looking at the changes in slope (e.g. the derivative). Next the distances between the marked points are computed and the ratios between the distances are used to identify bowel features or characteristics of the bowel. The features of the bowel perimeter are thus classified based upon the path of the ball and an advance knowledge of the geometric characteristic of the polyp or other irregularity being detected is therefore required.

An example of the rolling ball polyp detection technique is shown in FIGS. 8A–8G. Referring first to FIG. 8A, an image 142 includes several regions 143a–143f. As shown in FIG. 8B, region includes a features 150 and 152. A rolling ball polyp detection process is first performed on feature 150 as shown in FIG. 8C.

As shown in FIG, 8C, a test element 154 having the shape of circle (or ball) is moved or rolled along a surface 156 which may correspond for example to the surface of a bowel wall. In this example, the ball moves in the lumen region 155. It should be appreciated, however, that in alternate embodiments, the test element 154 may be provided having a shape other than a circular shape. It should also be appreciated that in some embodiments it may be desirable to move the ball 154 in a region other than the lumen region 155. When the ball 154 reaches a section of the surface 156 at a location where two portions of the ball 154 contact two portions of the of the surface 156 then a first point 158 is marked. Point 158a corresponds to the point where the slope of the surface 156 changes sign.

After point 158a is marked then the ball continues its path and points 158b, 158c are marked. Thus three points are marked where turns exist. Each of the points 158a–158c are selected by looking at the changes in slope (e.g. the derivative). Next the distances between the marked points are computed. Here the distance between points 158a and 158b is designated as 159*a*, the distance between points 158b and 158c is designated as 159*b* and the distance between points 158a and 158c is designated as 159*c*. The ratios between the distances 159a–159c are then used to identify bowel features or characteristics of the bowel. In FIG. 8C, the ration is computed as follows: the sum of the lengths 159*a* and 159*b* divided by the length 153*c*. The ratio of the lengths 159a–159c along the path defined by points 158a–158c indicate that the structure 152 has the shape of a polyp. This can be accomplished by comparing the ratio value to a predetermined threshold value. Thus, the above techniques computes the ratio formed by the deflection and travel paths of the test element and uses this information (e.g. by comparing the ratio value to a threshold value) to characterize the bowel structure.

As shown in FIG. 8D, the point 158 is defined by the intersection of lines 159a, 159b. Each of lines 159a, 159b project from the center of the ball 154 to the point at which the respective surfaces of the ball contact the two points of the surface 156.

It should be noted that it is important to distinguish collision points (e.g. points 158a, 158c) from turnaround points (e.g. point 158b).

Referring now to FIG. 8E, a semi-circular shaped structure 153 exists on the side of a triangular shaped structure 152. It should be appreciated that in this case, there are two ratios to compute. One ratio value for the structure 152 (i.e. the structure having the triangular shape) is formed by the sum of the lengths 161a–161e divided by the length 161f. Another ratio value for the semi-circular shaped structure 153 is formed by the sum of the lengths 161c–161c divided by the length 161g.

Figure 8F:
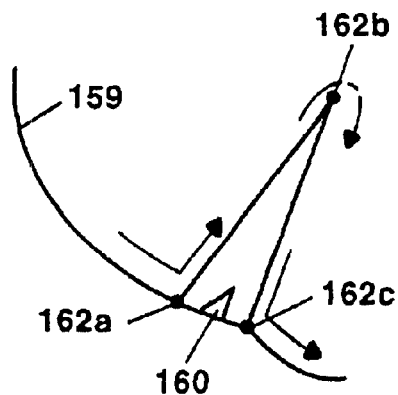
Figure 8G:
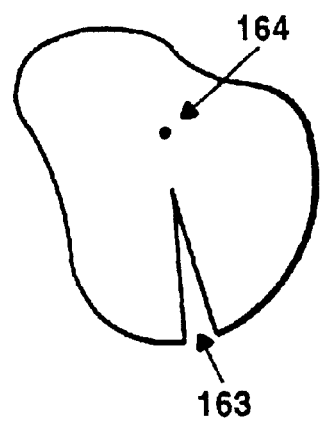
Figure 8H:
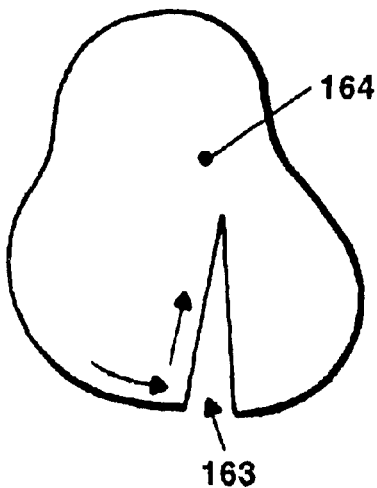

Referring now to FIGS. 8F–8H, surface 159 forms a structure 160. The rolling ball technique is used to define three points 162a, 162b, 162c which define the structure 160. In FIG. 8F, an average center point 164 has been computed (e.g. via the segmentation technique) and can be used to provide sufficient information with respect to "turning in" versus "turning away." This is accomplished by evaluating the absolute value of slope from collision to collision slope (referred to hereinafter as the pre-slope). The absolute value of the preslope will change as the ball test point moves around the bowel circumference. When a collision is found, the preslope value is used to assess the turn around point(s) and returns to the bowel wall. Turn around points correspond to maxima and minima of the slope encountered by the ball center point as this point moves from wall collision to wall collision.

A collision can be defined as when the perimeter of the test ball contacts two portions of the wall as illustrated in FIG. 8D. By setting the perimeter of ball correctly—as determined by empirical evaluation—one can select feature changes of a polyp or fold from the background concavity of the bowel perimeter.

Figure 8I:
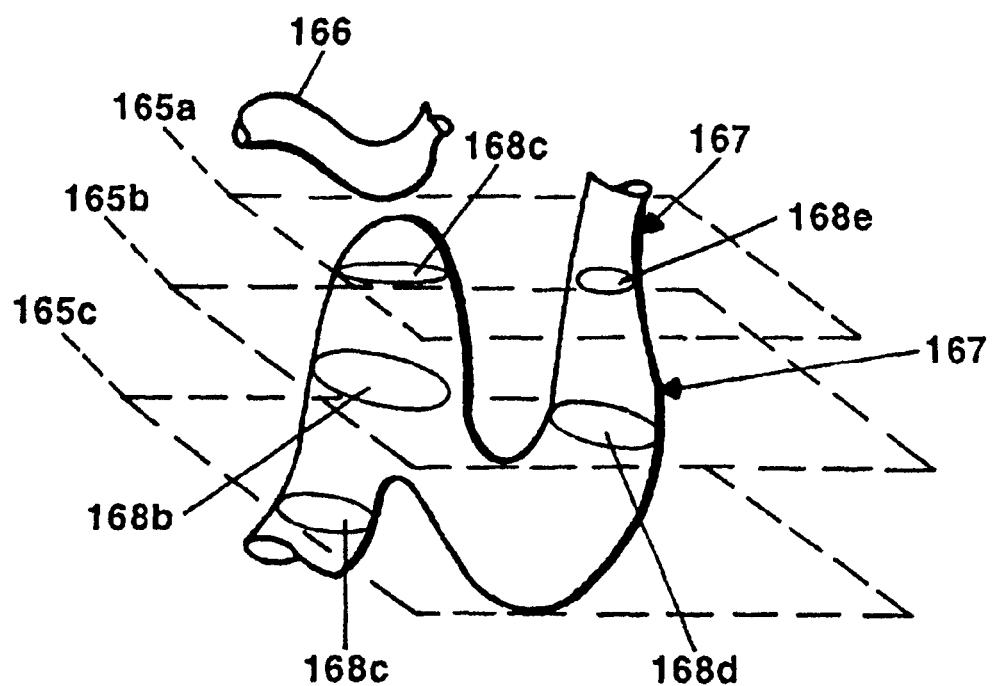
FIG. 8I is an example of automatic polyp detection using the rolling ball technique in a three dimensional image.

It should be appreciated that the rolling ball technique can also be performed in three dimensions (i.e. both around a circumference and up and down a longitudinal axis of a short tube) as shown in FIG. 8I. In FIG. 8I, a series of axial slices 165a–165c are used to construct a three-dimensional image of bowel sections 166 (small bowel loop) and 167 (loop of bowel). Regions 168a–168e correspond to the portions of the bowel which would be present in the axial images (e.g. as shown in FIGS. 1A and 1C). In the case where the rolling ball technique is applied to a three-dimensional bowel image, care must be taken to insure that each region of the bowel "tube" is examined.

Figure 9:
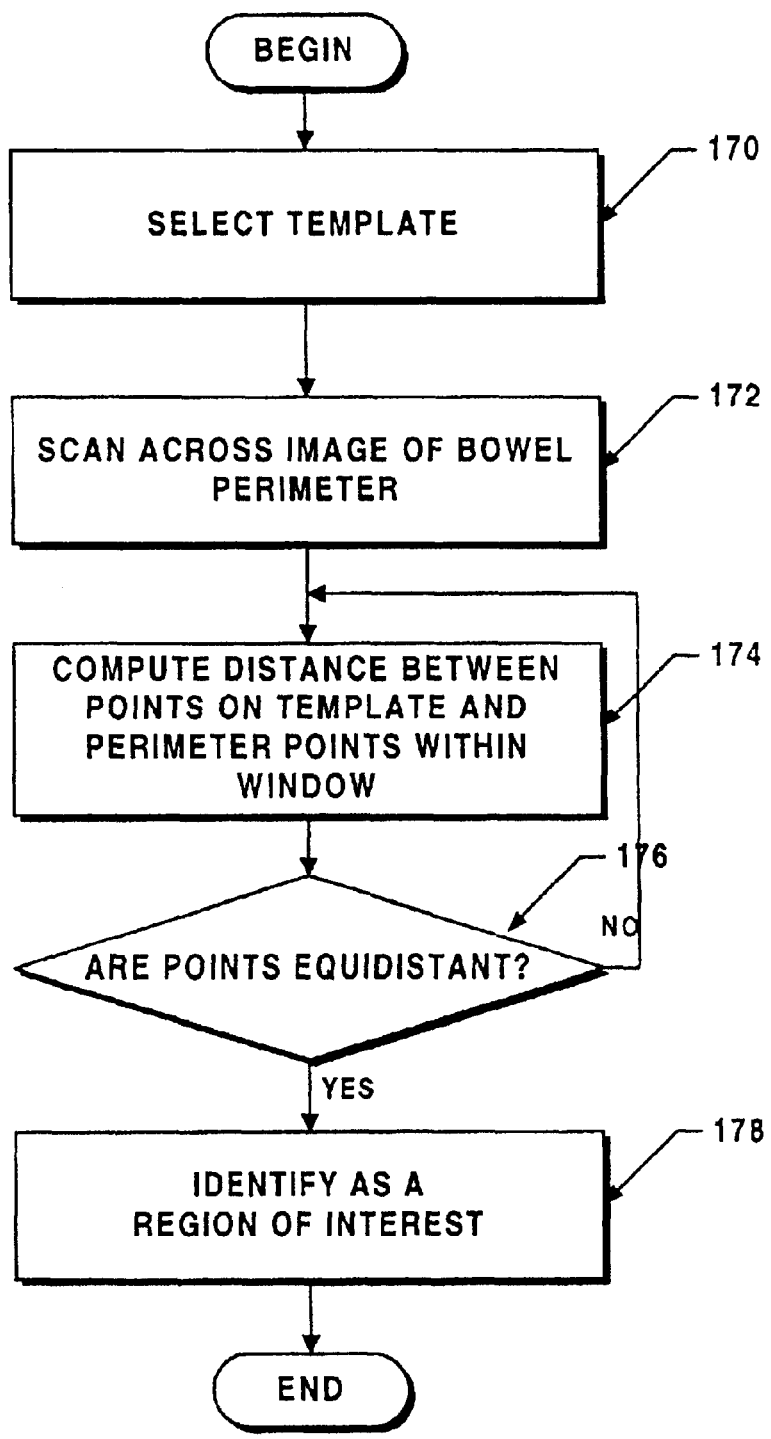
FIG. 9 is a flow diagram showing the steps of a distance matching technique to automatically detect a structure in a CT image of a bowel.

Referring now to FIG. 9, a third process for automatic detection of polyps, referred to as the so-called "distance search" technique begins with the step of selecting a polyp template 170. The template is selected having a predetermined shape. The shape is preferably selected to correspond to the shape of the bowel anomaly.

Figure 9A:
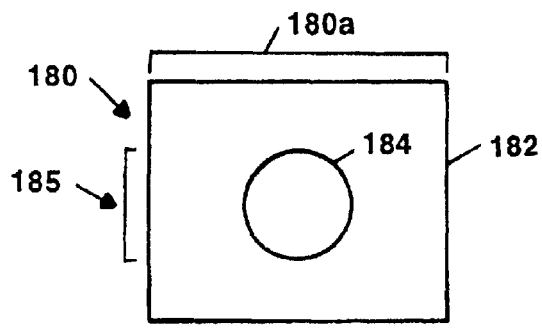

Referring briefly to FIG. 9A, for example, a template 180 includes a local window boundary 182 and a template pattern 184. The template pattern is here selected to be a circle 184 since the polyps tend to have substantially circular shapes as seen in 2D images. If applied in 3D, then spherical, or semi-sphere or other forms could be used by utilizing a 3D implementation. It should, however, be appreciated that in those applications in which the lesion sought to be detected had other than a circular shape, the template pattern would be selected accordingly. For example, if the lesion sought to be detected had a substantially triangular shape, then the template pattern would also be selected having a substantially triangular shape. The side 180a of the local window 180 is selected having a length which is as large as the largest lesion to be detected. The template pattern 184 is selected having a dimension as small as the smallest lesion to be detected.

Referring again to FIG. 9, once the window size and template pattern and size are selected, the local window 182 is scanned across the image of the bowel perimeter once it has already been segmented. Next, as shown in step 174 in FIG. 9, the distances between points on the template 184 and the perimeter points within the window 182 are made.

Figure 9B:
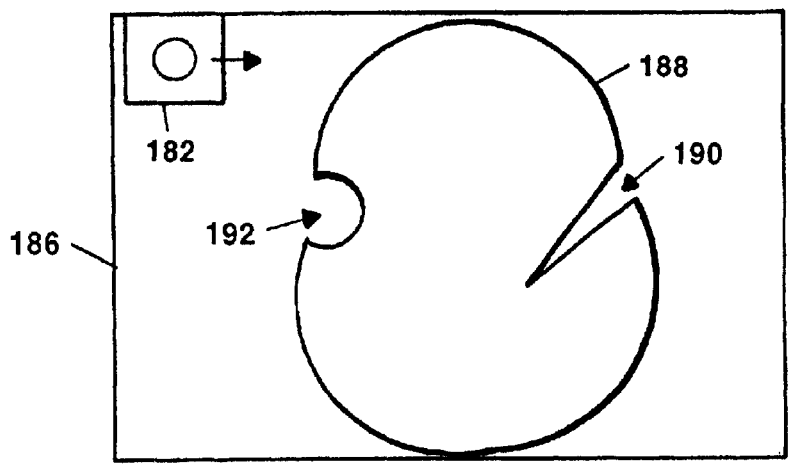
Figure 9C:
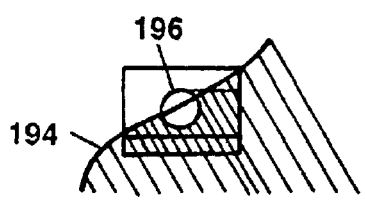
Figure 9D:
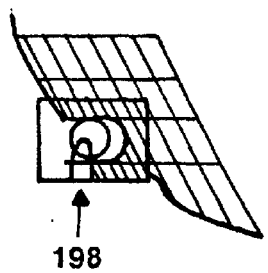

This may be more clearly understood with reference to FIGS. 9B–9D, in which an image 186 is segmented to include only the bowel perimeter 188. The bowel perimeter includes a fold 190 and a lesion 192. The window 182 is placed over the image 186 and moved across the entire image 186. When the window 182 reaches a location in the image 186 in which a portion of the bowel boundary is within the window and within the template 184 (as shown in FIGS. 9C, 9D) the distance between the points on the template 184 and the perimeter points within the window 182 are made. In one embodiment, the distances between 10–30 test points on the unit test circle and boundary points present within the moving frame should initially be made. Those of ordinary skill in the art should appreciate of course that the precise number of points used is not critical and that in some applications, it may be desirable or necessary to use a number of points fewer than 10 or greater than 30.

Referring now to step 176 and FIG. 9E, a determination is made as to whether the distances are equal. When the test circle becomes centered within a circular lesion, then the distances between the circle perimeter and boundary points of the lesion becomes equal and the standard deviation of a group of those distances approaches a minimum value (See FIGS. 9F and 9G). Its should be noted that the above process is carried out in one plane and it is necessary to search in three orthogonal planes to be complete. The point where the standard deviation of a group of those distances approaches a minimum value is the point which should be marked as a center of a suspected lesion (i.e. identified as a region of interest as indicated in step 178). After the technique is run in all three planes, those lesions that were tagged in 2 of 3 or 3 of 3 planes can be finally tagged as suspicious regions. This technique can thus be used to distinguish a fold from a polyp. It should be noted that depending upon the feature to be selected, other statistical tools, aside from standard deviation can be used to identify regions of match between the roving template and features of the segmented image.

The technique described above in conjunction with FIGS. 9–9G, thus searches for patterns of distance. The technique is thus relatively computationally expensive but it is also relatively rigorous. One advantage of this technique is that t does not matter how large the template is relative to the polyp so one scanning works for all lesions.

In FIG. 9G, a plot 209 of distance around the template vs. template position is shown. Region 210 of curve 209 is relatively flat thus indicating that a region of the image contained a shape which matched the shape of the template. When the template is provided having a round shape (e.g. as shown in FIGS. 9E, 9F), the flat region 210 indicates that a corresponding shape is found in the structure being searched.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system for performing a virtual colonoscopy comprising:
   (a) a digital image generating system;
   (b) a storage device, coupled to said digital image generating system, said storage device for storing digital images; and
   (c) a digital bowel subtraction processor coupled to receive images of a colon from said storage device, said digital bowel subtraction processor for processing the received digital images of the colon to digitally remove the contents of the colon from the image.

2. The system of claim 1 further comprising:
   an automated polyp detection processor coupled to receive images of a colon from said storage device, said automated polyp detection processor for processing the received digital images of the colon to detect polyps in the colon image.

3. The system of claim 2 wherein said automated polyp detection processor processes images from which bowel contents have been removed by said digital bowel subtraction processor.

4. The system of claim 1 wherein said digital bowel subtraction processor corresponds to a raster digital bowel subtraction processor.

5. The system of claim 4 wherein said raster digital bowel subtraction processor comprises:
   a threshold circuit for assessing whether absolute threshold values have been crossed and the ratio at which they have been crossed;
   an analysis kernal to scan across images and apply threshold values in a predetermined logic sequence;
   means for selecting a starting pixel;
   means for selecting a direction to apply a threshold;
   a threshold application means; and
   a pixel reset means.

6. The system of claim 1 wherein said digital bowel subtraction processor corresponds to a gradient processor digital bowel subtraction processor.

7. The system of claim 6 wherein said gradient processor digital bowel subtraction processor comprises:
   a threshold circuit for defining a soft tissue threshold value, an air threshold value and a bowel threshold value;
   a mask processor for marking elements above the bone threshold value;
   a gradient processor for applying a air and bowel threshold values to appropriate regions wherein said gradient processor forms a first mask to capture a first shoulder region in a region corresponding to a transition between air and bowel;
   a dilation processor for identifying a second shoulder region in the region corresponding to a transition between air and bowel;
   a subtractor for subtracting the combined masks from the gradient processor to leave a desired image.

8. The system of claim 2 wherein said automated polyp detection processor comprises:
   a segmentor to extract pixels in a region which includes a boundary between soft tissue and air in the colon;
   a rolling ball processor; and
   a vector processor for computing a ratio along a travel path and comparing the travel path to a threshold value.

9. The system of claim 2 wherein said automated polyp detection processor comprises:
   a convolution processor for performing a convolution between a test polyp and a region under test, to indicates the similarities between the region under test and the test polyp.

10. Thy system of claim 9 wherein said convolution processor generates a correlation matrix and wherein the convolution polyp detector further comprises a filter to identify portions of the region undertest which have relatively high correlation values.

11. The system of claim 2 wherein said automated polyp detection processor comprises a distance processor for aligning a distance template over the image and for computing a plurality of distance values, each of the plurality of distance values corresponding to a distance between a selected point on the distance template and a point on a bowel perimeter with each of the plurality of distance values computed using a different point on the bowel perimeter.

12. The system of claim 11 wherein said automated polyp detection processor further comprises a comparison circuit for comparing each of the plurality of distance values.

13. The system of claim 12 wherein said comparison circuit includes means for comparing each of the plurality of distance values by subtracting the values to provide a relative distance value.

14. The system of claim 11 wherein said automated polyp detection processor further comprises a segmentor to extract pixels from the image to provide a region which includes a boundary between soft tissue and air in the colon and wherein said distance processor for aligns the distance template over the region provided by said segmentor.

15. The system of claim 1 further comprising:
   a detection system coupled to said digital bowel subtraction processor for detecting, in the digital images of the colon having contents digitally removed therefrom, regions having one or more characteristics similar to the characteristics of a polyp;
   an indicator system for indicating on the images those regions detected by said detection system.

16. The system of claim 1 further comprising a mucosa insertion processor for providing a mucosa layer.

17. The system of claim 16 wherein said mucosa insertion processor comprises:
   a gradient processor for applying a gradient operator to an image from which bowel contents have been digitally extracted to identify pixels corresponding to a boundary between bowel wall and non-bowel wall regions in the image; and
   a smoothing processor for smoothing the boundary over a predetermined width along the boundary.

18. The system of claim 17 wherein said smoothing processor comprises a filter which filters the pixels which form the boundary.

19. The system of claim 18 wherein said filter is provided having a constrained Gaussian filter characteristic.

20. The system of claim 19 wherein the predetermined width corresponds to one of:
   a width of ten pixels;

a width in the range of two to five pixels; and a width of three pixels.

21. The system of claim 1 further comprising a contrast agent adapted for ingestion by a patient prior said digital image generating system generating one or more bowel images of the patient.

22. The system of claim 16 wherein said digital bowel subtraction processor comprises:

a threshold circuit for applying a threshold function to the image of the colon; and a gradient analyzer for performing a gradient analysis of the image of the colon to define a first region corresponding to a wall region and a second region corresponding to a bowel contents region.

23. The system of claim 6 wherein said gradient processor digital bowel subtraction processor comprises:

a transition region identifier for identifying a portion of an image corresponding to an image transition, region having a first portion which corresponds to bowel contents, a second portion which corresponds to bowel wall and a third portion disposed between the first and second portions which corresponds to a transition between the bowel contents and the bowel wall;

a shoulder region identifier for identifying first and second shoulder regions in the image transition region;

means for dilating a boundary of the first shoulder region by applying a first threshold function to the bowel image;

a gradient processor for applying a gradient to the bowel image to define a first region corresponding to a wall region and a second region corresponding to a bowel contents region; and means for digitally removing the second region from the bowel image.

24. The system of claim 23 wherein said a shoulder region identifier comprises:

means for dilating pixels around a portion of the image transition region corresponding to the second shoulder region;

a comparator for comparing each of the pixel values to a gradient threshold value;

means, responsive to a pixel value being less than the gradient threshold value, for setting that pixel value equal to a first predetermined value corresponding to a first one of a contents region and a wall region; and means, responsive to a pixel value being greater than the gradient threshold value, for setting that pixel value equal to a second predetermined value corresponding to a second one of the contents region and the wall region.

25. The system of claim 16 wherein said digital bowel subtraction processor comprises:

a pixel analysis map processor for generating a first pixel analysis map (PAM) from the image;

means for stepping the first PAM across the image in a raster pattern;

means for locating an air region in the image by examining a predetermined set of elements defined by the PAM;

means for searching an area around the air element to locate a bowel region adjacent the air region; and means for subtracting the bowel contents from the image.

26. The system of claim 1 further comprising:

means for representing an image of the colon by an array of pixels; and means for selecting pixels in the image which represent bowel contents wherein said means for selecting pixels comprises:

means for forming a pixel analysis map comprising an array of pixels, with predetermined ones of the pixels in the map having a spatial relationship and a predetermined threshold value;

means for applying the pixel analysis map to the image;

a comparison processor for comparing the values of the predetermined ones of the pixels in the pixel analysis map to pixels in the image and indicating whether the corresponding pixel in the image represents one of bowel contents or bowel wall; and means for setting values of pixels in the image corresponding to bowel contents to one of a pixel value corresponding to air and a pixel value corresponding to a bowel.

27. The system of claim 26 wherein said pixel analysis map processor comprises:

means for defining a plurality of central pixels at the center of the pixel analysis map;

means for defining a plurality of boundary pixels disposed about the plurality of central pixels; and means for defining a plurality of outer boundary pixels disposed about the plurality of boundary.

28. The system of claim 27 wherein said comparison processor comprises:

means for selecting a first pixel of the plurality of central pixels;

means for computing a difference value between a pixel in the image which is in a position adjacent to the position of the first pixel and an outer boundary pixel proximate the first pixel; and means, responsive to the difference value being above a gradient threshold, for setting the values of all pixels between the first pixel and the outer boundary pixel to a predetermined value.

29. The system of claim 28 wherein the predetermined value corresponds to one of an air value and a bowel value.

30. The system of claim 2 wherein said automated polyp detection processor comprises:

means for obtaining a test structure template from a first CT image;

means for selecting a portion of a second CT image;

means for performing a convolution between the test structure template and the selected portion of the second CT image to produce a correlation matrix; and means for identifying regions in the second image having values with a high correlation to characteristics of a polyp.

31. The system of claim 30 wherein said means for obtaining a test structure template comprises;

means for obtaining a first CT image which includes a structure of the type to be detected; and means for excising the structure from the CT image to provide the test structure.

32. The system of claim 30 wherein said means for identifying regions in the second image comprises:

a filter for filtering values which are below a predetermined correlation threshold value; and means for designating a region of an image as having a likelihood of containing a structure with a shape which is similar to the shape of the test structure.

33. The method of claim 31 wherein the test structure template corresponds to a polyp template and the structure of the type to be detected in the first CT image corresponds to a polyp.

34. The system of claim 2 wherein said automated polyp detection processor comprises:
   means for moving a test element along a boundary of a bowel;
   means for tracking a path defined by the movement of the test element;
   means for detecting changes in direction of the test element in the path;
   means for classifying bowel features based upon the path of the test element and the changes in direction of the test element.

35. The system of claim 34 wherein said means for detecting changes in direction of the test element in the path comprises:
   means for computing changes in slope of the path defined by the test element;
   means for marking a point at each location at which the direction of the slope of the path
   means for changes; computing distances between each of the marked points; and
   means for computing a ratio value using each of the distances.

36. The system of claim 34 wherein said means for classifying bowel features comprises means for identifying bowel features using the ratio value computed by said means for computing a ratio value.

37. The system of claim 35 wherein the test element is provided having a circular shape; and a spherical shape.

38. A system of claim 2 wherein said automated polyp detection processor comprises:
   means for applying a template to a region of an image which contains a bowel perimeter;
   means for computing a plurality of distances between the template and the bowel perimeter, each of the plurality of distances corresponding to a distance from at least one point on the template to one of a plurality of points on the bowel perimeter; and
   means for determining whether the distances are equal.

39. The system of claim 38 further comprising means for identifying the image region as containing a structure having a shape which is similar to the shape of the template in response to the distances being equal.

40. The system of claim 38 wherein applying a template to a bowel perimeter comprises: means for segmenting a bowel image to produce to an image from which pixels which do not form the bowel perimeter have been filtered.

41. The system of claim 38 wherein said means for computing a plurality of distances between the template and the bowel perimeter comprises means for computing the distances between points on a perimeter of the template and points on the perimeter of the bowel.

42. The system of claim 38 wherein said means for determining whether the distances are equal comprises means for computing a standard deviation between the distances.

* * * * *

UNITED STATES PATENT AND TRADEMARK OFFICE
CERTIFICATE OF CORRECTION

PATENT NO.         : 6,947,784 B2
APPLICATION NO. : 09/828268
DATED                  : September 20, 2005
INVENTOR(S)         : Michael E. Zalis It is certified that error appears in the above-identified patent and that said Letters Patent is hereby corrected as shown below:

Column 19, line 35 delete "said a shoulder" and replace with --said shoulder--.

Column 21, line 15 delete "in slope" and replace with --in the slope--.

Column 21, line 18 delete "of the slope of the path" and replace with --in the slope of the path;--.

Column 22, line 17 delete "to produce to an image" and replace with --to produce an image--.

Drawings page 15 of 20, delete "FIGS. 8A-8E" and replace with the attached sheet for --FIGS. 8A-8E--.

UNITED STATES PATENT AND TRADEMARK OFFICE
CERTIFICATE OF CORRECTION

PATENT NO. : 6,947,784 B2  
APPLICATION NO. : 09/828268  
DATED : September 20, 2005  
INVENTOR(S) : Michael E. Zalis Page 2 of 2

It is certified that error appears in the above-identified patent and that said Letters Patent is hereby corrected as shown below:

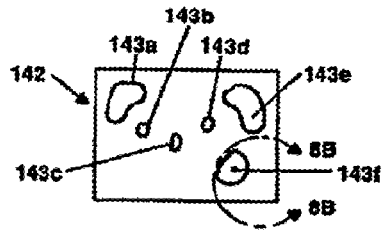

FIG. 8A

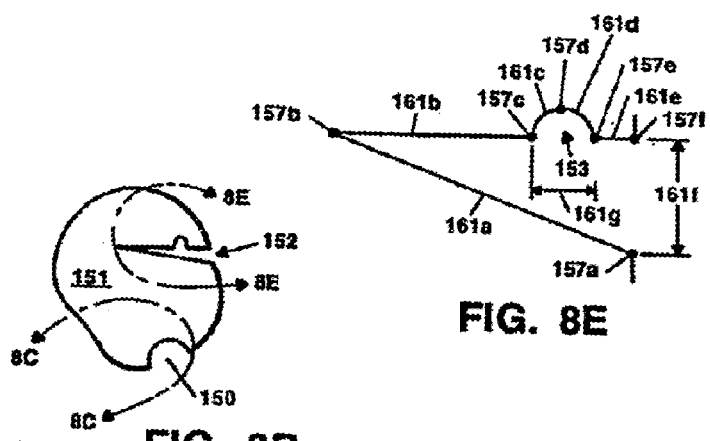

FIG. 8B

FIG. 8E

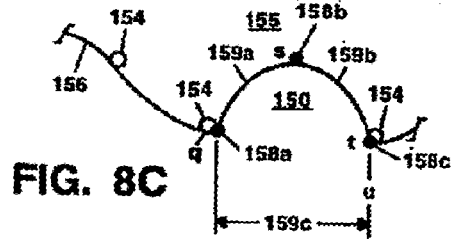

FIG. 8C

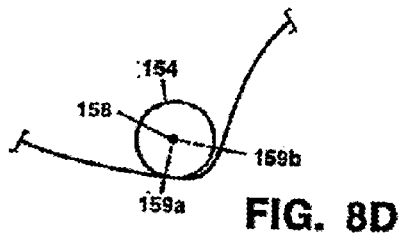

FIG. 8D

Signed and Sealed this

Twenty-first Day of November, 2006

JON W. DUDAS  
*Director of the United States Patent and Trademark Office*